US012391018B2

(12) United States Patent
Baker et al.

(10) Patent No.: US 12,391,018 B2
(45) Date of Patent: Aug. 19, 2025

(54) SYSTEMS AND METHODS FOR PACKAGING INSTRUMENTS OR OTHER ITEMS WITH BAG MAKING FEATURES

(71) Applicant: RST Automation LLC, Bronx, NY (US)

(72) Inventors: Russell Baker, Bronx, NY (US); Lawrence Zelner, Bronx, NY (US)

(73) Assignee: RST AUTOMATION LLC, Bronx, NY (US)

( * ) Notice: Subject to any disclaimer, the term of this patent is extended or adjusted under 35 U.S.C. 154(b) by 170 days.

(21) Appl. No.: 17/225,839

(22) Filed: Apr. 8, 2021

(65) Prior Publication Data

US 2021/0316523 A1 Oct. 14, 2021

Related U.S. Application Data

(60) Provisional application No. 63/008,277, filed on Apr. 10, 2020.

(51) Int. Cl.

| | |
|---|---|
| ***B31B 70/00*** | (2017.01) |
| ***B31B 70/02*** | (2017.01) |
| ***B31B 70/10*** | (2017.01) |
| ***B31B 70/16*** | (2017.01) |
| ***B31B 70/64*** | (2017.01) |

(Continued)

(52) U.S. Cl.
CPC .......... *B31B 70/006* (2017.08); *B31B 70/024* (2017.08); *B31B 70/10* (2017.08); *B31B 70/16* (2017.08); *B31B 70/642* (2017.08); *B31B 70/94* (2017.08); *B31B 2155/003* (2017.08); *B31B 2241/00* (2013.01)

(58) Field of Classification Search
CPC ..... B31B 70/006; B31B 70/024; B31B 70/94; B31B 70/642; B31B 70/10; B31B 70/16; B31B 2155/003; B31B 2241/00
USPC .......................................................... 493/186
See application file for complete search history.

(56) References Cited

U.S. PATENT DOCUMENTS 2,257,823 A * 10/1941 Stokes .................. B65B 9/2042 206/820
2,633,286 A * 3/1953 Claridge ................ B31B 70/62 493/217

(Continued)

FOREIGN PATENT DOCUMENTS

FR 1559791 A 3/1969
JP H08-048302 A 2/1996

(Continued)

*Primary Examiner* — Sameh Tawfik
(74) *Attorney, Agent, or Firm* — ArentFox Schiff LLP

(57) ABSTRACT

A bagmaker interoperable with an item processor is disclosed, the bagmaker being configured to produce bags for packaging items for sterilization, such as medical instruments. The bagmaker may include a controller interoperable with a bag production device, the bag production device including a bag cutter and a heat sealer, such that tubing may be sealed and cut, such that a bag of a specified length is formed. Operation of the bagmaker may include identifying tubing corresponding to a bag width of the bag, advancing tubing to correspond with the length of the bag, sealing at least a first end of the tubing, and then advancing and cutting the tubing; ejecting the bag from the bagmaker and retracting remaining uncut tubing, wherein the retraction and ejection may occur contemporaneously or interchangeably in order.

21 Claims, 34 Drawing Sheets

(51) Int. Cl.
*B31B 70/94* (2017.01)
*B31B 155/00* (2017.01)

(56) References Cited

U.S. PATENT DOCUMENTS

| | | | | | |
|---|---|---|---|---|---|
| 3,194,124 | A * | 7/1965 | Warp | B31B 70/00 493/197 |
| 4,232,589 | A * | 11/1980 | Ernst | B65B 43/123 493/233 |
| 4,500,307 | A * | 2/1985 | Bridgeman | B31B 70/00 493/198 |
| 4,726,169 | A * | 2/1988 | Achelpohl | B31B 70/628 53/553 |
| 5,080,747 | A * | 1/1992 | Veix | B29C 66/83221 156/364 |
| 5,409,441 | A * | 4/1995 | Muscoplat | B43M 5/04 493/248 |
| 5,417,639 | A * | 5/1995 | Cronauer | B31B 70/946 493/346 |
| 5,549,538 | A * | 8/1996 | Marsik | B65D 31/08 493/264 |
| 5,993,368 | A * | 11/1999 | Benovitz | B31B 70/10 493/200 |
| 6,080,093 | A * | 6/2000 | Henderson | B65D 33/01 493/926 |
| 7,048,224 | B2 * | 5/2006 | Allgood | B65H 35/10 206/390 |
| 11,046,550 | B2 * | 6/2021 | Civolani | B31B 70/262 |
| 11,511,561 | B2 * | 11/2022 | Robinson | B65B 5/02 |
| 12,095,208 | B2 * | 9/2024 | Mahoney | H01R 13/17 |
| 2009/0020393 | A1 * | 1/2009 | Garwood | B65G 13/10 198/345.3 |
| 2013/0194654 | A1 * | 8/2013 | Moidu | G02B 26/0841 359/291 |
| 2018/0105306 | A1 | 4/2018 | Lockhart et al. | |
| 2019/0193881 | A1 | 6/2019 | Pecherskiy et al. | |
| 2019/0389121 | A1 * | 12/2019 | Kataoka | B29C 53/56 |
| 2023/0039365 | A1 * | 2/2023 | Tomori | B65H 18/08 |
| 2024/0252026 | A1 * | 8/2024 | Hornak | F16G 13/16 |

FOREIGN PATENT DOCUMENTS

| | | | | |
|---|---|---|---|---|
| JP | 2006-256671 | A | 9/2006 | |
| JP | 2006-282192 | A | 10/2006 | |
| JP | 2021127196 | A * | 9/2021 | B65H 18/021 |

* cited by examiner

SYSTEMS AND METHODS FOR PACKAGING INSTRUMENTS OR OTHER ITEMS WITH BAG MAKING FEATURES

CROSS-REFERENCE TO RELATED APPLICATIONS

The current application claims priority to, and the benefit of, U.S. Provisional Application No. 63/008,277 filed on Apr. 10, 2020, entitled "Systems and Methods for Packaging Instruments or Other Items with Bag Making Features," the contents of which are hereby incorporated by reference in their entireties.

TECHNICAL FIELD

Aspects of the present disclosure relate to bag, pouch, or peel pouch making devices for the production of bags, pouches, and/or peel pouches for sterilization and packaging a variety of different devices, such as medical instruments, that may require bags, pouches, and/or peel pouches of varying parameters, including dimensions, material, etc.

BACKGROUND

In the production of devices required to meet strict sterilization requirements, such as medical instruments for use in hospitals, the devices must be packaged and sterilized such that the sterilization is not compromised during the final stages of production, shipping, or storage before their implementation. Thus, as part of the sterilization process, these devices are often packaged in bags, pouches, and/or peel pouches.

SUMMARY

Consequent of the deficiencies described above, as well as others, there remains an unmet need for a bagmaker for automating bags, pouches, and/or peal pouches for packaging and sterilizing a variety of different devices, wherein the devices include a variety of different parameters, such as dimensions or materials.

According to various aspects, the present disclosure describes a bagmaker interoperable, for example, with an instrument processor, wherein the bagmaker may be configured to produce bags, pouches and/or peal pouches for packaging instruments, such as medical instruments for sterilization. The bagmaker may include a controller and a bag production device, wherein the controller and the bag production device may interoperate such that a selected quantity of tubing may be fed to the bag production device, cut to a specified length, and then heat sealed by the bag production device via a plurality of commands issued by the controller. In order to cut and heat seal the tubing, the bag production device may include a bag cutter and a heat sealing device. The bagmaker may further include at least one roller, wherein each roller may be interoperable with a motor, such that the one roller may supply the tubing to the bagmaker. The tubing may comprise the material from which the bags, pouches, and/or peel pouches are made.

Further, aspects of the present disclosure describe a variety of example methods of use of the bagmaker. In one example, the method may include identifying tubing of the correct width for producing the appropriately dimensioned bag. Following, the tubing may be advanced a length corresponding to the desired length of the bag, such that the tubing may align at the correct point with a heat sealer component of the bagmaker. This may allow for the bagmaker to form a bag of the desired length. Then the method may further include sealing a first end of the tubing, wherein the seal may be formed via a heat sealer component of the bagmaker. Following, the method of the present disclosure may include advancing the tubing an additional length, wherein the additional length may also correspond to a desired length of the bag. The cut in combination with the seal may produce a bag, pouch, and/or peel pouch for an instrument, such as a medical device instrument. The method may next include ejecting the bag, pouch, and/or peel pouch from the bagmaker and retracting remaining uncut tubing, wherein the retraction and ejection may occur contemporaneously or interchangeably in order. In another example, the bag width and length may be determined based on the size and packaging of the instrument to be bagged. An item may then, for example, be received within a second, open end of the bag, pouch, and/or peel pouch, and the second end may then be sealed, such as by re-insertion of the second end within the heat sealer component.

Additional advantages and novel features of these aspects will be set forth in part in the description that follows, and in part will become more apparent to those skilled in the art upon examination of the following or upon learning by practice of the disclosure.

DETAILED DESCRIPTION

Figure 1:
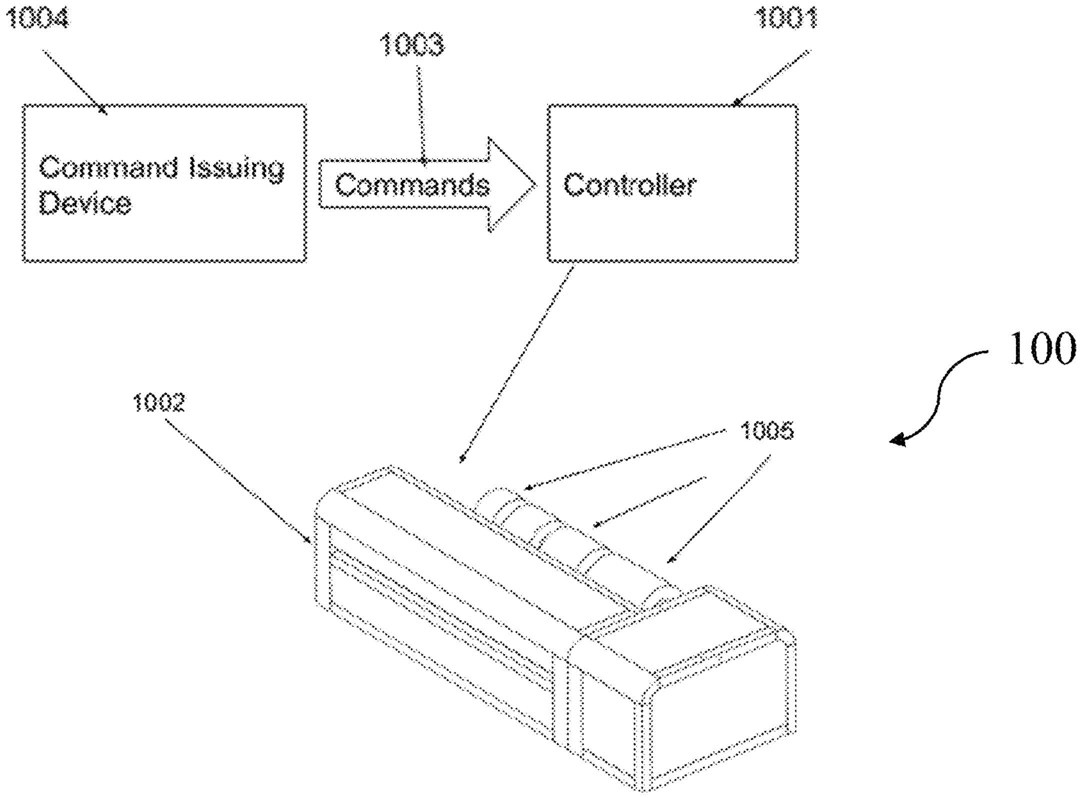
FIG. 1 is a perspective view of an example bagmaker, according to various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Throughout the disclosure, the term approximately may be used as a modifier for a geometric relationship among elements or for the shape of an element or component. While the term approximately is not limited to a specific variation and may cover any variation that is understood by one of ordinary skill in the art to be an acceptable variation, some examples are provided as follows. In one example, the terms approximately may include a variation of less than 10% of the dimension of the object or component. In another example, the term approximately may include a variation of less than 5% of the object or component. If the term approximately is used to define the angular relationship of one element to another element, one non-limiting example of the term substantially or approximately may include a variation of 5 degrees or less. These examples are not intended to be limiting and may be increased or decreased based on the understanding of acceptable limits to one of skill in the relevant art.

For purposes of the disclosure, directional terms are expressed generally with relation to a standard frame of reference when the system and apparatus described herein are installed an in an in-use orientation. In order to provide context to the current disclosure, a broad overview of the discovered deficiencies of various systems and an example implementation of the current disclosure and the advantages provided by the disclosure are described below. Further details of example implementations of the current disclosure are described in detail with reference to the figures below.

In implementations that require the re-sterilization of recently cleaned items or the sterilization of just produced items, the process of sterilization or re-sterilization may include placing an item, such as a medical instrument, inside of a semi-permeable bag, pouch, or peel pouch, wherein the bag, pouch, or peel pouch (hereinafter also interchangeably referred to herein as "packaging"), and the enclosed item may be may sterilized via steam or another suitable chemical based or other sterilization method. In one example implementation, the bag, pouch, or peel pouch may include of two different sides, one side comprising a semi-permeable (e.g., paper) material and the other side comprising a semi-permeable plastic material. In some implementations of the production of this packaging for devices to be sterilized, in order to preserve the sterilization required through the later stages of production, shipping, and storage before required use, to simplify and quicken the production process, some producers of devices to be may implement machine automated item bagging. However, machine automated bagging devices of the related art are often limited in their application and usefulness. For example, in the related art, there is often a large waste of materials used when forming the bags, and additionally, the machine automated bagging devices of the related art are limited by the size of the bag they are able to produce. Often the machine automated bagging devices of the related art are configured such that they are only capable of creating bags for one type of item to be bagged. In another example, conventional bagging may require premade pouches of fixed sizes. An operator may manually trim the premade pouches to fit instruments to be bagged. The trimmed portions of the premade pouches are not used in the bagging of the instruments, and may be discarded. Therefore, conventional bagging may be tedious and/or wasteful, among other disadvantages. Thus, various aspects of the present disclosure may in part address these deficiencies (as well as others) through cooperative operation with implementation of advanced machine vision technology. Among other things, this technology may facilitate the identification of the item, device, or other similar instrument being packaged, and then the creation of a correspondingly sized, heat-sealed packages, which may not only reduce the production times of the bags, pouches, and/or peel pouches, but also may significantly reduce material waste.

According to aspects of the present disclosure, FIG. 1 illustrates various features of an example implementation of a bagmaker 100, in accordance with aspects of the present disclosure. The bagmaker 100 may include a controller 1001 and a bag production device 1002, wherein the controller 1001 may be in communication with the bag production device 1002. In this example implementation, the controller 1001 may receive a plurality of commands 1003 from a command issuing device 1004. The commands 1003 may be transmitted using USB protocol, RS-232, I2C, or any other suitable electronic communication protocol. For example, the commands 1003 may be sent from a separate computer or microprocessor; however, in another example, the commands 1003 may be generated by user input via an external or incorporated input mechanism such as buttons, keypad, touch screen, bar code (e.g., with preset commands), voice commands or a handheld device, such as mobile phone. Further, the commands 1003 may be interpreted by the controller 1001 and then implemented in the controlling of the bag production device 1002.

As further illustrated in FIG. 1, the bag production device 1002 may employ a range of sizes of tubing 1005, such as in one or more rolls. Tubing 1005 may be for use in sterilization, wherein the tubing may be available from a variety of manufacturers, such as from the company Crosstex of Hauppauge, New York. In one example, as shown in FIG. 1, the tubing 1005 may be configured to be in the form of one or more rolls. In use, for example, the tubing 1005 may first be cut to a desired length, wherein following, an item, such as a medical instrument, may be emplaced within the aforementioned cut tubing 1005, and one or both ends of the cut tubing 1005 may then be sealed, such as with a heat sealing device, so that a bag, pouch, and/or peel pouch may thereby be formed. The cut and sealed tube may interchangeably be referred to as a bag, pouch or peel pouch herein. In one example implementation, the commands 1003 may direct the controller 1001 as to which tubing size to use, a desired length of the bag to produce, and any other pertinent information regarding bag production.

In the bag production device 1002 of FIG. 1, internal electromagnetic and/or other components may permit the bag production device to manipulate and then seal and cut tubing 1005 from the one or more rolls. Each internal electromagnetic and/or other components may be individually addressable by the controller 1001. The controller 1001 may direct the actions of an internal electromagnetic and/or other components in response to a command sent from the command issuing device 1004. The sent command 1003 may include content that determines the operation of the addressed component.

Figure 2:
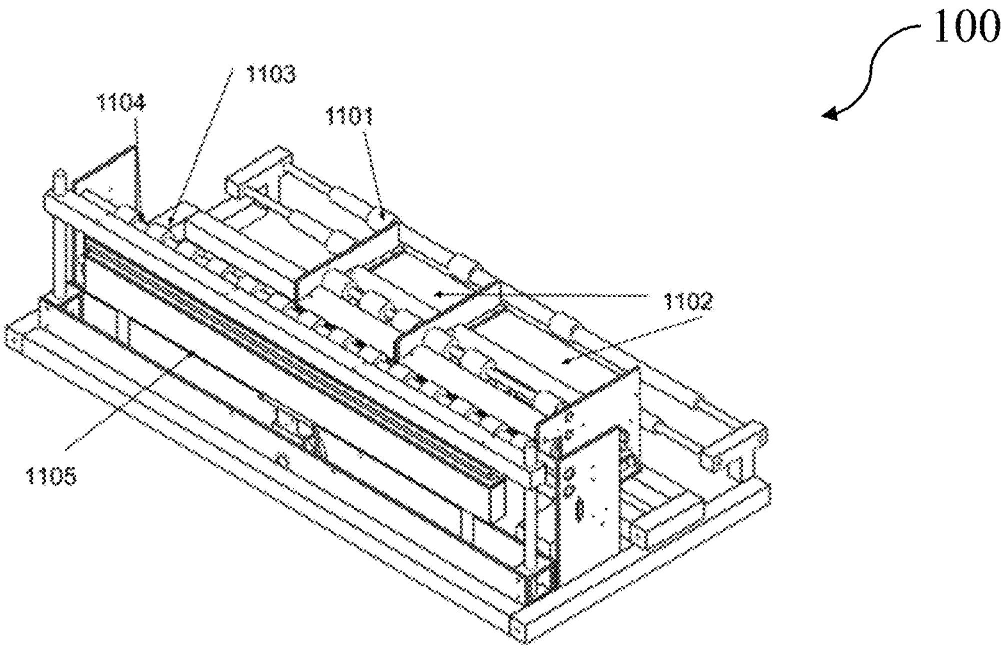
FIG. 2 is a perspective view of an example bagmaker with a removed cover, according to various aspects of the present disclosure.

FIG. 2 illustrates an example implementation of bag production device 100, wherein bag production device 100 is depicted with a portion of its outer covering removed. As shown in FIG. 2, bag production device 100 may further include tubing holders 1101, wherein tubing holders 1101 may be configured to hold the tubing 1005 (FIG. 1). Further, the tubing 1005 may be configured to be selectively inserted or otherwise fed into a plurality of module rollers 1102. Bag production device 100 may also include a bag cutter 1103, a secondary roller 1104, and a heat sealer 1105. In one example, one module roller 1102 for each roll of tubing 1005 may be provided, wherein the module rollers 1102 may be individually activateable, such that the any number of sterilization tubes 1005 may be manipulated contemporaneously, for example. The module roller 1102 and secondary roller 1104 may control the selective insertion of the tubing 1005. The bag cutter 1103 may cut the tubing 1005 to form a bag, wherein the bag may be cut to a predetermined length. Finally, the heat sealer 1105 may be configured to seal the cut tubing 1005 at each cut end in order to create an enclosed volume.

Figure 3A:
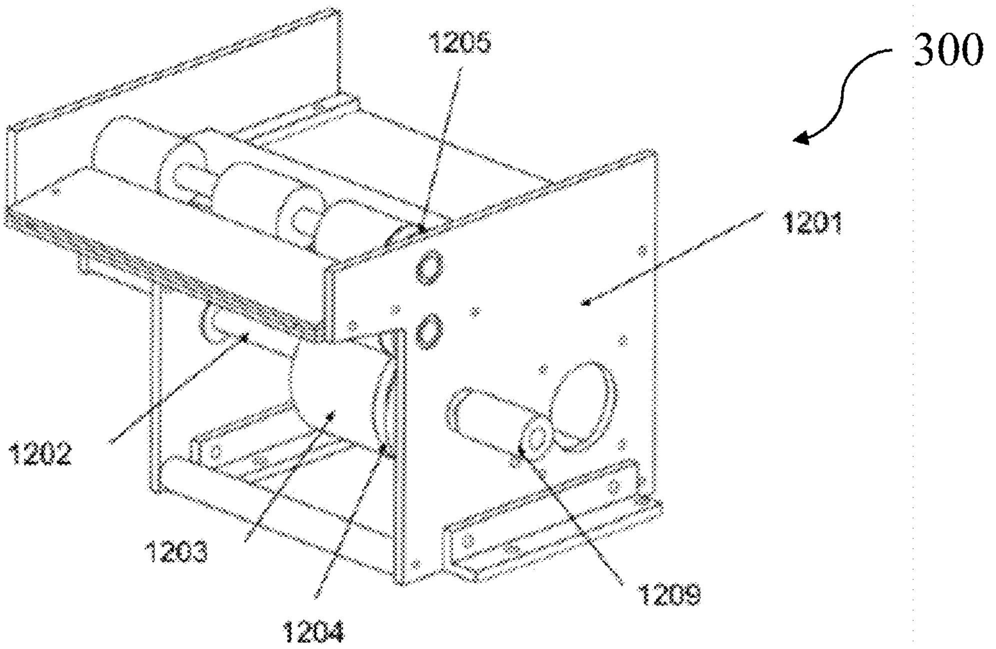
FIG. 3A is a front perspective view of an example module roller, according to various aspects of the present disclosure.
Figure 3B:
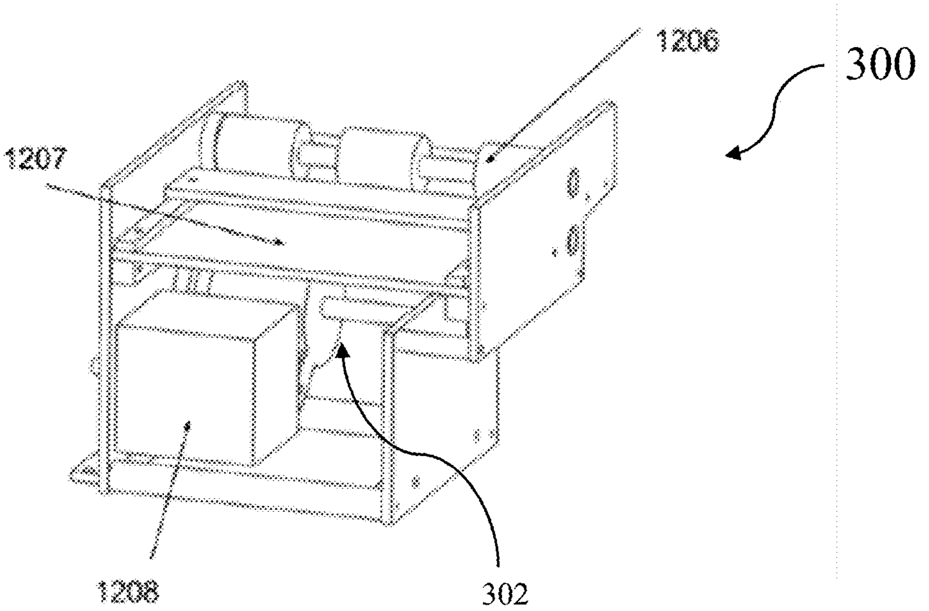
FIG. 3B is a rear perspective view of an example module roller, according to various aspects of the present disclosure.

FIGS. 3A and 3B show a front perspective view and rear perspective view, respectively, of various features of an example module roller 300 for use in accordance with aspects of the present disclosure. Module roller 300 may be configured to interoperate with a bag of a selected or otherwise specified width, wherein the bag width may be determined by the size of the item to be contained therein and/or available sizes of tubing engaged with the module roller 300, such as tubing 1005 of FIG. 1. In certain aspects of the present disclosure, the bagmaker 100 (FIG. 1) may include multiple module rollers (e.g., module roller 300), which in some implementations may each have a different width. Each of the module rollers may be configured for a bag of a certain width, for example. In one example implementation, as illustrated in FIGS. 3A and 3B, module roller 300 may be configured to interoperate with tubing 1005 configured to be 4 inches in width, for example. However, in other example implementations, module roller 300 may be configured to interoperate with tubing, such as tubing 1005 of FIG. 1, of a variety of different widths. The module roller 300 may include a body or housing 1201, the body 1201 being configured to house a drive shaft 1202 engaged with an electromagnetic clutch and/or other engaging feature 1203. Further, module roller 300 may also include a clutch gear or similar interoperating feature 1204, one or more roller gears 1205, one or more rollers 1206, and a bag feed slot 1207. In one example, the roller gears 1205 may be comprised of a lower roller gear and an upper roller gear. In one example, the bagmaker 100 may be configured to include one module roller 300. However, in an alternative example, bagmaker 100 may be configured to include a plurality of module rollers 300. In the example of incorporation of a plurality of module rollers 300, the plurality of module rollers 300 may be configured to interoperate, such that one of the plurality of module rollers 300 may be designated and otherwise configured to be a lead module roller. The lead module roller may interoperate with an electric motor 1208, wherein the electric motor 1208 may be coupled to the drive shaft using a timing belt and pulley drive and/or any other suitable features for conveying rotational motion from a motor to a shaft. Consequently, the plurality of module rollers 300 may be configured to apply rotational motion via the Lead Module Roller, such that the entire system may interoperate with only a single motor 1208. Specifically, the rotational motion applied to the drive shaft 1202 by the electric motor 1208 may further be applied to the drive shafts of additional modules (not illustrated in FIGS. 3A and 3B) using, for example, a shaft coupler 1209.

The shaft coupler 1209 may securably fix the trailing end of the drive shaft 1202 of a first Module roller to the leading end of the drive shaft of a second module roller. The coupling of the module roller shafts may allow for a succession of multiple module rollers to be coupled together while only requiring one motor.

When the electromagnetic clutch 1203 of the module roller 300 is deactivated, the corresponding drive shaft 1202 may spin freely. However, when the electromagnetic clutch 1203 is activated, the previously free spinning component of the electromagnetic clutch 1203 may become engaged with the drive shaft 1202, such that the electromagnetic clutch 1203 and the drive shaft 1202 may turn contemporaneously. Further, the clutch gear 1204 may be affixed to or otherwise engaged with such spinning component. The clutch gear 1204 in turn may engage the lower roller gear 1205*a*, such that the lower roller gear 1205*a* may then engage the upper roller gear 1205*b*. The roller gears 1205 may be fixed to the two rollers 1206, and consequently the two rollers 1206 may spin in opposing rotational directions.

In one example, a roll of tubing 1005 (FIG. 1) may be fed into module roller 300 through the bag feed slot 1207, wherein the bag feed slot 1207 may be comprised of an opening, wherein the opening may have a width slightly wider than the width of the tubing 1005 (FIG. 1). Further, the height of the opening of bag feed slot 1207 may be configured to be more than the thickness of the tubing 1005 (FIG. 1) and less than 1/16", such that the tubing may be maintained in a flat configuration while being fed therethrough. In one example, when the bottom roller spins counter clockwise, the roll is unspooled. When the bottom roller spins clockwise, the unrolled tubing 300 may be pushed towards the roll.

Figure 4:
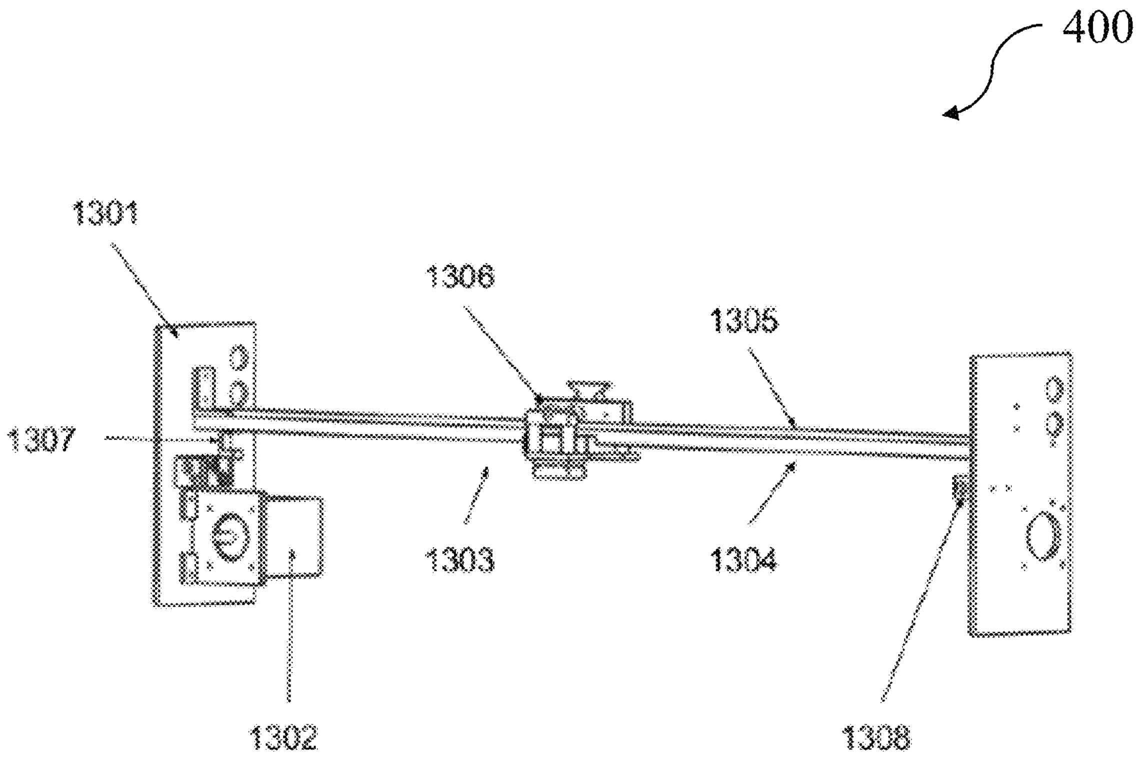
FIG. 4 is a perspective view of an example bag cutter, according to various aspects of the present disclosure.

According to various aspects of the present disclosure, further aspects 400 of an example bag cutter (e.g., bag cutter 1103 of FIG. 2) are depicted in FIG. 4. These aspects 400 include a body 1301, wherein body 1301 may house or have fixed thereto a motor 1302 interoperable with a drive belt 1303, belt idling pulleys 1308 and/or rollers (such as the rollers shown in FIGS. 1 and 3), a linear rail 1304 with an affixed gear rack 1305, a circular blade carriage assembly 1306, and limit switches 1307.

Figure 5:
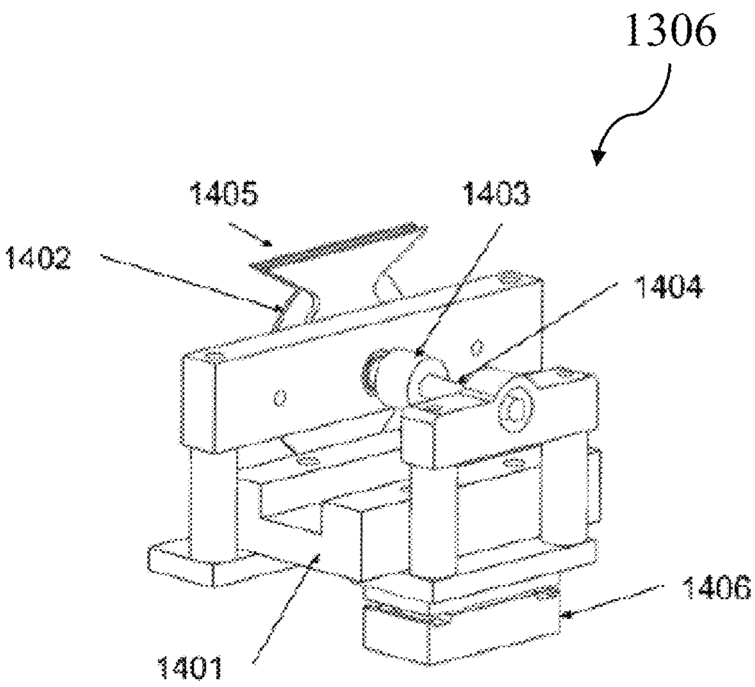
FIG. 5 is a perspective view of an example circular blade carriage assembly, according to various aspects of the present disclosure.

FIG. 5, according to various aspects, illustrates in greater detail various features of the example circular blade carriage assembly 1306 of FIG. 4. Specifically, the circular blade carriage assembly 1306 may include a carriage 1401, wherein carriage 1401 may be matably engageable with the linear rail 1304 (FIG. 4). Further, carriage 1401 may also include a circular blade 1402 and gear 1403 affixed to a shaft 1404, wherein the gear 1403 may be matably connectable with the gear rack 1305, as illustrated in FIG. 4. Additionally, carriage 1401 may include one or more guides 1405, wherein guides 1405 may be configured to position the tubing 1005 (FIG. 1) for engagement with the blade 1402 to cut the tubing 1005 (FIG. 1), and a belt clamp 1406, wherein the belt clamp 1406 may be configured to securably fix the blade carriage assembly 1306 relative to the drive belt 1303 (FIG. 4). In one aspect, the guides 1405 may be optional. When the motor 1302 (FIG. 4) spins, the drive belt 1303 (FIG. 3) may move accordingly. The point of attachment between the belt 1303 (FIG. 3) and the belt clamp 1405 may be repositioned then pulled along the rail 1304 (FIG. 4). If the circular blade carriage assembly 1306 (FIG. 4) is pulled along the rail 1304 (FIG. 4), the gear 1403 may engage with the rack 1305 (FIG. 4), such that blade 1402 may be engaged in rotary motion. As the circular blade carriage assembly 1306 is positioned with respect to the rail 1304 (FIG. 4), the carriage assembly 1306 may cuttingly engage tubing 1005 (FIG. 1), wherein tubing 1005 (FIG. 1) may span the distance between the module roller 1102 (FIG. 2) and the secondary roller 1104 (FIG. 2). The guides 1405 may lift the tubing 1005 (FIG. 1) to the spinning blade cutter 1402, such that the tubing 1005 (FIG. 1) may be cut.

Figure 6:
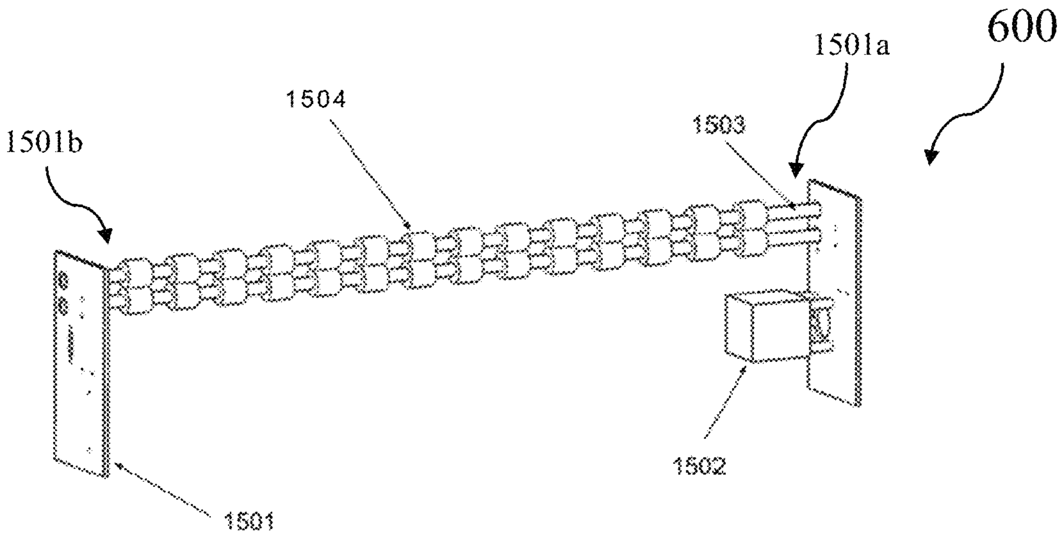
FIG. 6 is a perspective view of an example second roller, according to various aspects of the present disclosure.

FIG. 6, according to various aspects of the present disclosure, illustrates various features 600 of a secondary roller (e.g., secondary roller 1104 of FIG. 2). Such features 600 may include a body 1501, wherein body 1501 may be configured to house or have affixed thereto a motor 1502. Motor 1502 may be configured to power one or more drive components 1503, wherein drive components 1503 may be configured to interoperate with a plurality of rollers 1504. In one example, drive components 1503 may be configured to be cylindrical rods that extend between a first side 1501*a* and a second side 1501*b*, wherein both sides 1501*a* and 1501*b* are included in body 1501. Further, rollers 1504 may also be configured to have approximately cylindrical outer surfaces, wherein rollers 1504 may also include a central recess (not illustrated), such that rollers 1504 may be received upon drive components 1503 via the central recess. When motor 1502 is actuated, the motor 1502 may apply a rotary motion to the drive components 1503, such that the top roller and the bottom roller may spin in rotationally opposed directions. Further, a bag received via the secondary roller may be gripped between pairs of top and bottom rollers such that the tangential motion of the gripped bag is in the same direction as the rotational motion of the rollers.

Figure 7:
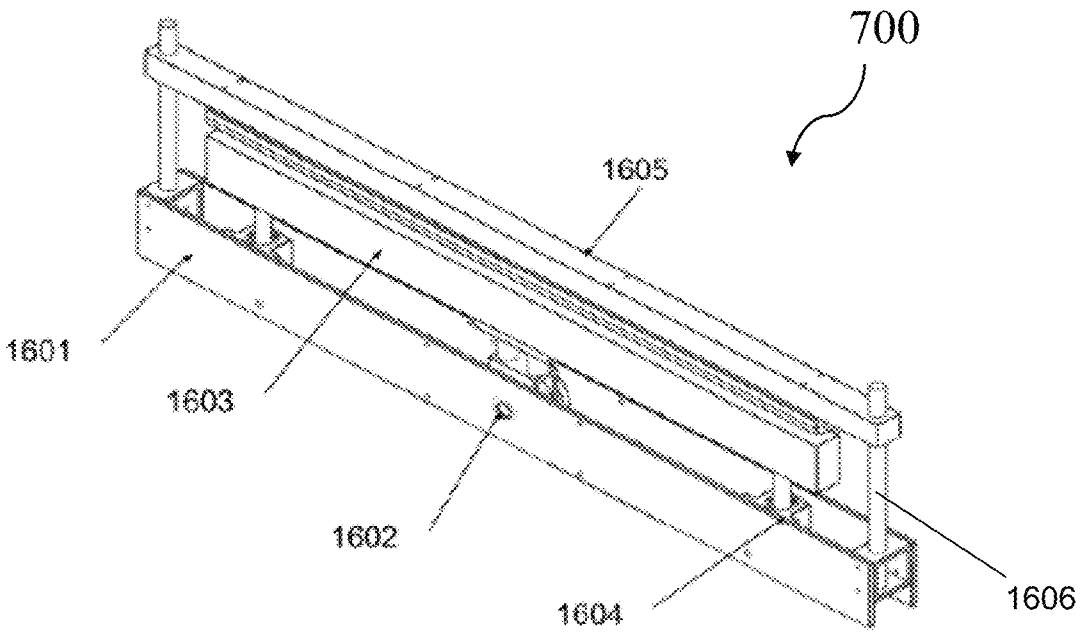
FIG. 7 is a perspective view of an example heat sealer, according to various aspects of the present disclosure.

According to various aspects of the present disclosure, various aspects 700 of an example heat sealer (e.g., heat sealer 1105 of FIG. 2) is illustrated in FIG. 7. The depicted heat sealer 700 may include a body 1601, wherein body 1601 may house and/or interoperate with a drive 1602, a compression bar 1603, one or more compression bar guides 1604, a hot bar 1605, and one or more hot bar mounts 1606. Further, heat sealer 700 may also include a drive assembly, wherein the drive assembly may comprise a motor 1701, a gear 1702, and a rotary cam 1705 or other similarly operating feature, wherein the motor 1701, the gear 1702, and the rotary cam 1705 may be configured to interoperate. In one example implementation, the compression bar guides 1604 may include linear bearings. Compression bar guides 1604 may also or alternatively include other guiding features, such as slots for receiving corresponding shafts extending from or otherwise operatively engaging compression bar 1603 (see also FIG. 9 and corresponding description). The heat sealer 700 may exert a specified pressure in order to create a viable seal, wherein as the sealing area gets longer, the force exerted may need to be increased proportionally. Consequently, a driving mechanism for the heat sealer 700 (e.g., a motor, such as motor 1702 and the drive assembly shown in FIG. 8) may need to be capable of producing such force required to create a viable seal.

Figure 8:
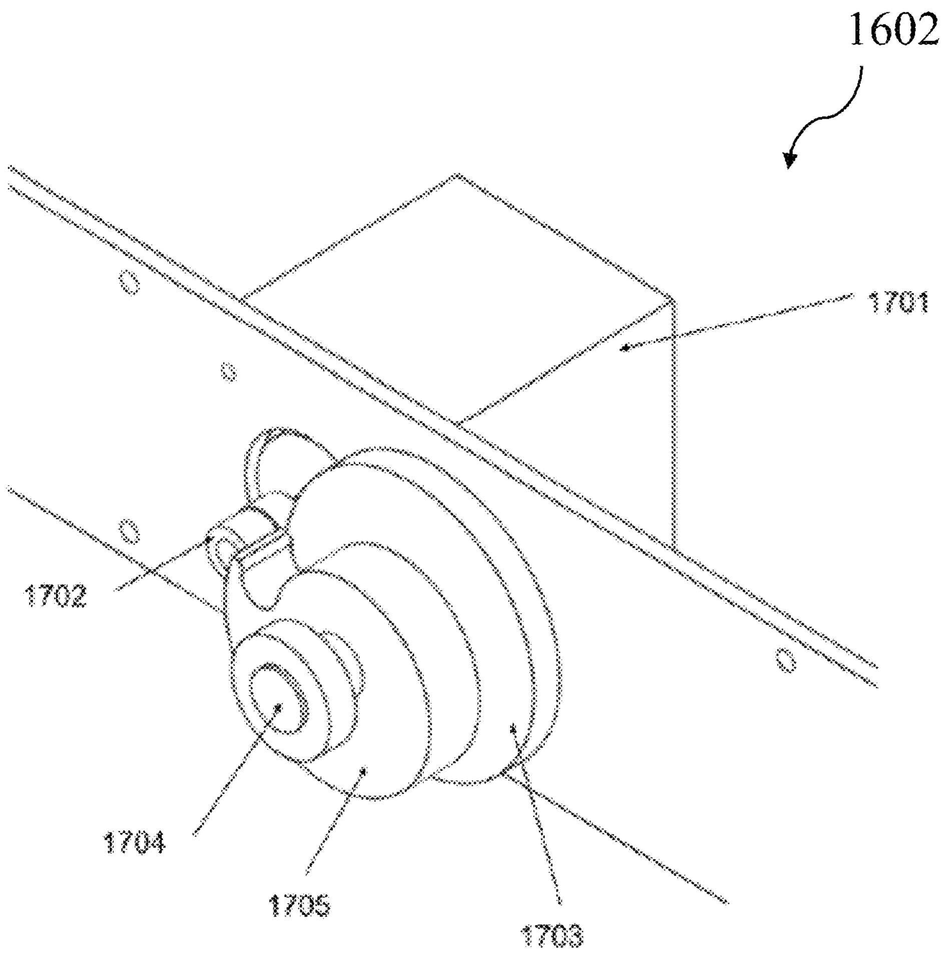
FIG. 8 is a perspective view of an example drive, according to various aspects of the present disclosure.

In FIG. 8, various features of the example drive 1602 of FIG. 7 are shown. As shown in FIG. 8, drive 1602 may include a motor 1701, wherein motor 1701 may be configured to have attached to a rotating shaft extending therefrom, or otherwise be engageable therewith, a pinion gear 1702. Further, drive 1602 may also include a main shaft 1704, wherein main shaft 1704 may be configured to have a spur gear 1703 received thereon, as well as a rotary cam 1705. As the motor 1701 spins, the pinion gears 1702 may rotationally engage the spur gear 1703, such that rotary cam 1705 may rotate therewith. As the rotary cam 1705 rotates, the vertical radius 1704, as defined as the farthest edge of the rotary cam

1705 as measured from the outer surface of the main shaft 1704, may increase in length and consequently push up on the compression bar 1603.

Figure 9:
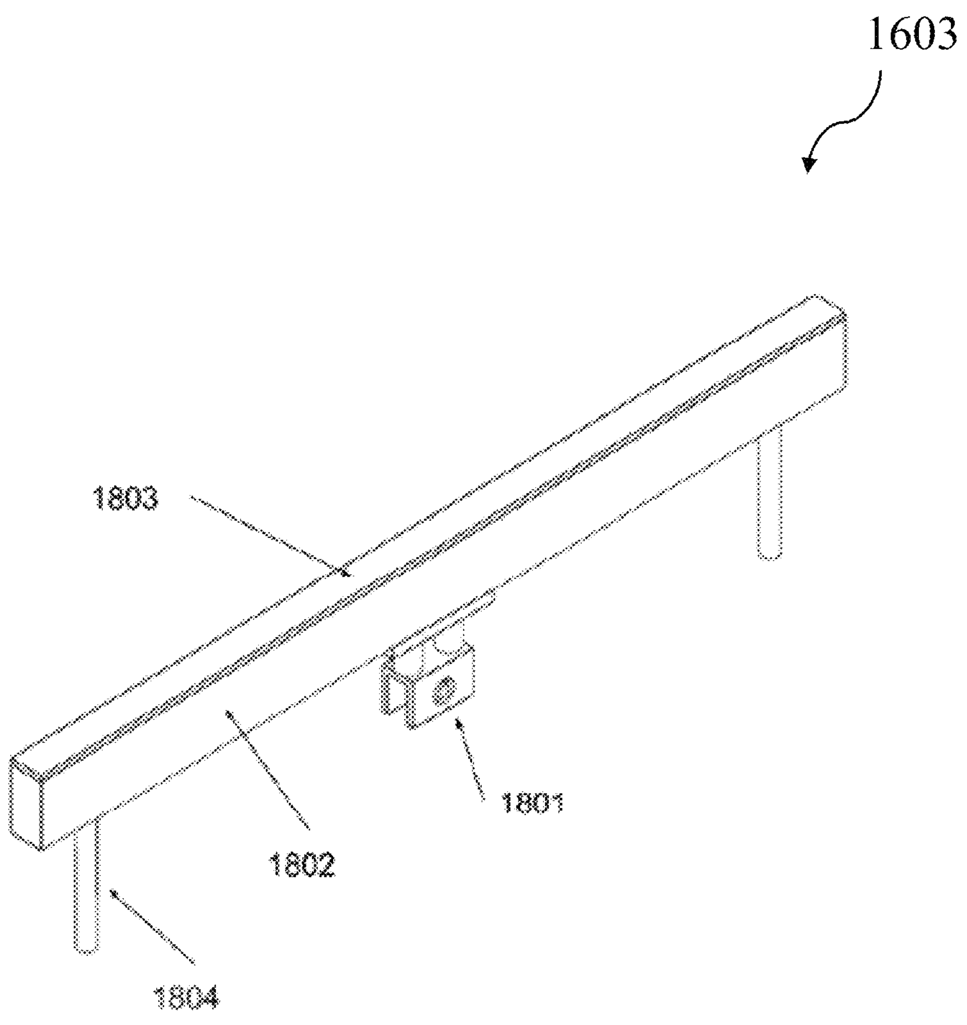
FIG. 9 is a perspective view of an example compression bar according to various aspects of the present disclosure.

FIG. 9 illustrates various features of the example compression bar 1603 of FIG. 7. The compression bar 1603 may comprise a cam roller 1801, wherein cam roller 1801 may be configured to interoperate with structural element 1802. Structural element 1802 may further include a heat resistant non-stick surface 1803. Further, compression bar 1603 may include one or more linear shafts 1804, wherein linear shafts 1804 may be configured to slide within or otherwise engage corresponding compression bar guides 1604 (not illustrated). In some examples, the heat resistant non-stick surface 1803 may be or include a strip of silicone rubber. The cam roller 1801 may rest upon or otherwise be engaged by the rotary cam 1705 (FIG. 8), wherein as the rotary cam 1705 rotates, the cam roller raises and lowers the structural element 1802 via the linear shafts 1804, depending on the cam's rotational position. To perform a seal, the rotary cam 1705 rotates until the compression bar 1603 pushes against the hot bar 1605, such that the compression bar 1603 may be held in place for a prescribed period of time. Further, rotary cam 1705 may then rotate so as to allow retraction the compression bar 1603 (e.g., due to gravity and/or a spring or other biasing element that may bias the compression bar 1603 away from the hot bar 1605.

Figure 10:
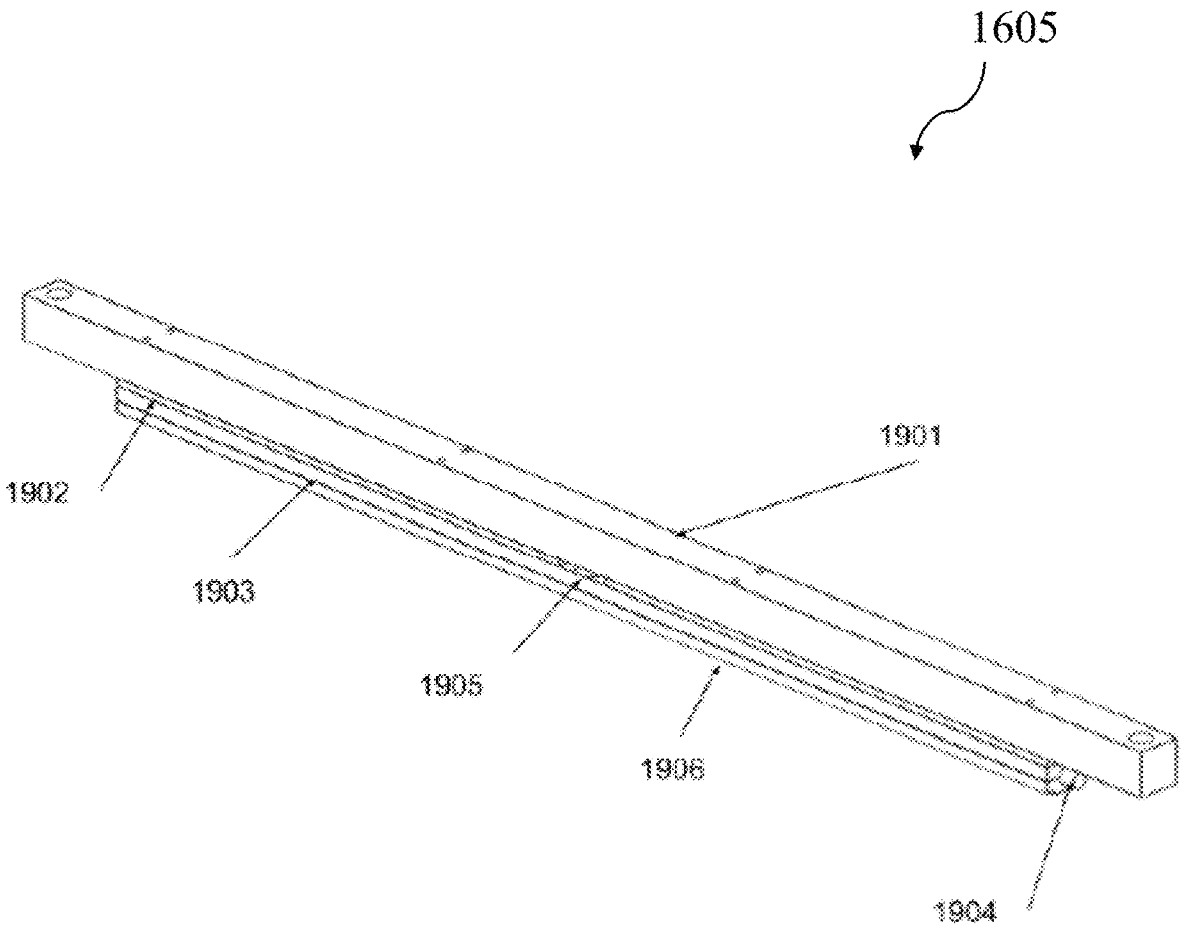
FIG. 10 is a perspective view of an example hot bar, according to various aspects of the present disclosure.

Various example features of the hot bar 1605 of FIG. 7 are further depicted in FIG. 10. The hot bar 1605 may include a structural element 1901, an insulator 1902, one or more spacers (not shown in FIG. 10, which may be located, for example, between the structural element 1901 and the sealing bar 1903), a sealing bar 1903, wherein sealing bar 1903 may include one or more heating elements 1904, and a temperature measurement device 1905. The sealing bar 1903 may be heated by the one or more heating elements 1904. Further, hot bar 1605 may be made of Aluminum and/or any other suitable material capable of withstanding the required temperatures of the sealing process. In some example implementations, the heating elements 1904 may be or include insertion heaters powered by, for example, an alternating current (AC) voltage source, and the temperature measurement device 1905 may be or include a K-Type thermocouple (although other thermocouple types and/or other alternative devices and/or methods of temperature measurement may be implemented), wherein the K-Type thermocouple may be affixed to the sealing bar 1903 via a fastening mechanism, such as a bolt or screw, for example. The thermocouple or other temperature measurement device 1905 may be attached or otherwise securably fixed in a location such that its readings accurately correspond to the surface temperature of a sealing face 1906. Temperature control may be achieved by various temperature control features, wherein the temperature control features may include feeding temperature data from the temperature measurement device 1905 into a controller (e.g., controller 1001 of FIG. 1) that may include algorithmic based operation. In one example, the algorithmic operation may convert the difference between the received temperature data and the desired temperature value into a pulse width modulation signal for the heating elements 1904.

Figure 11:
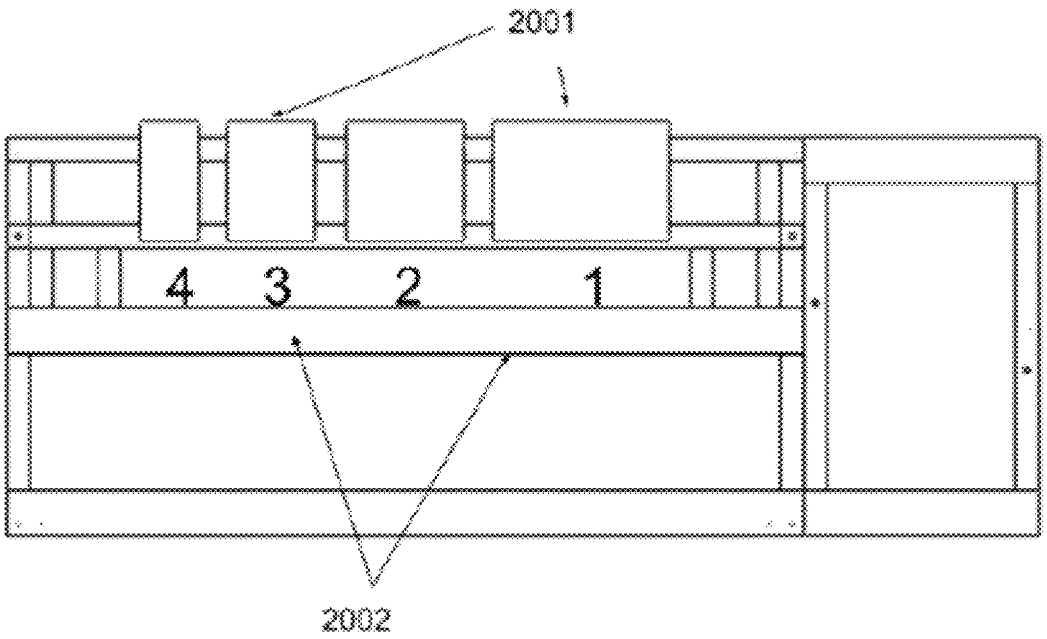
FIG. 11 is a perspective view of an example plurality of tubes for use in accordance with various aspects of the present disclosure.

To implement control of the control system for the bagmaker device system, a plurality of configuration parameters may be employed. For example, the presence and location of the different cross-sectional sizes ("widths") of tubing 1005 (FIG. 1) may be important to the production of an appropriately sized bag, pouch, and/or peal pouch for sterilization. Referring to FIG. 11, in an example implementation, four rolls of tubing 2001 shown at the labeled locations 2002, '1', '2', '3', and '4' may be used. The rolls of tubing 2001 may be located at positions corresponding to the locations of roller modules. In the example implementation illustrated in FIG. 11, the roll of tubing 2001 at position '2' may be about 4 inches wide, for example, and correspondingly located at a 4 inch wide roller module; however, any suitable tubing size may be located in any location. In one example, the presence and location of the different sizes of tubing 1005 may be maintained as computer readable data 210 within a configuration file 212, as further described in relation to FIG. 12. For each line of configuration file 212 in FIG. 12, the left hand side of the equals sign may include the location 2101 of the roll of tube 2001 (FIG. 11), and the data on the right hand side of the equals sign may correspond to the width of the bag 2102 (FIG. 11). Other features for storing data may also be implemented, such as via storage and/or access of this or other data in a data repository, as variables in software, or any other method or features familiar to those skilled in the art.

Figure 13:
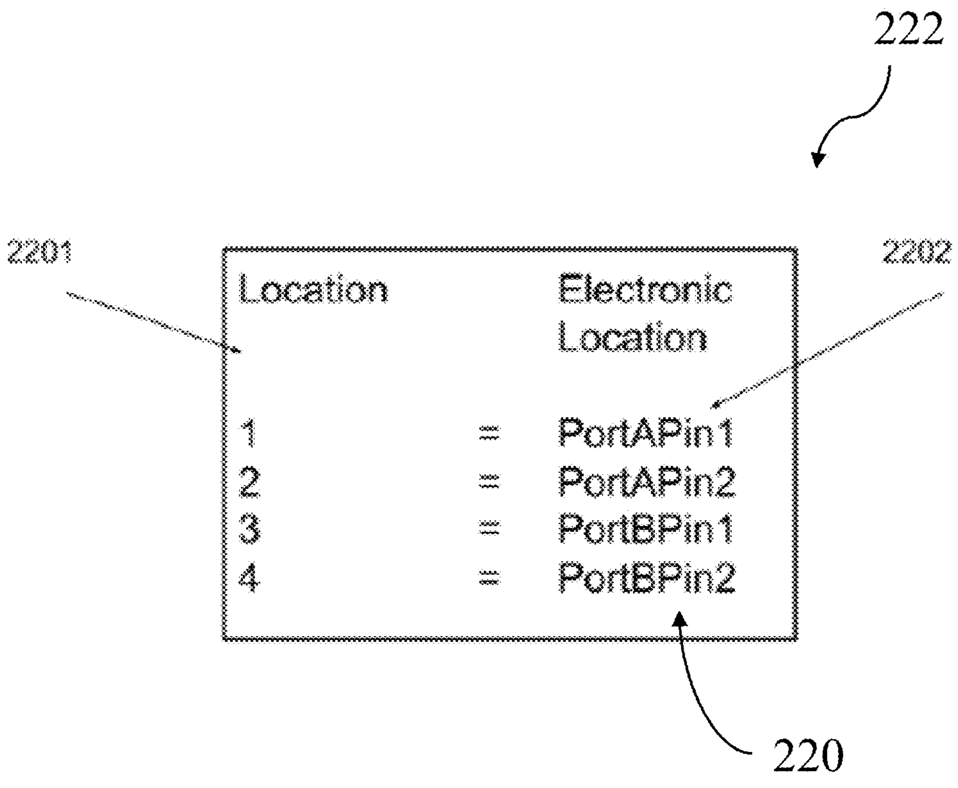
FIG. 13 shows another example of port pins corresponding to a particular location within a configure file, according to various aspects of the present disclosure.

As further shown in FIG. 11, the locations 2002 may also refer to various features relating to an electronic location for purposes of electrical and/or computer operation. For example, the electronic location may include an electrical device location having a corresponding electrical or electronic coupling, for purposes of operation relating to device(s) at locations 2002. In one example, the roller modules may be activated by an electromagnetic clutch and/or other engaging feature 1203 (FIG. 3A), wherein electromagnetic clutch and/or other engaging feature 1203 (FIG. 3A) may be activated by a current passing through an electric coil and/or other operational control feature housed internally within the clutch and/or other engaging feature 1203 (FIG. 3A). The current to the coil or other such control feature may be governed, for example, by one or more transistors and/or other suitable electronic components activated via a controller (e.g., controller 1001 of FIG. 1). Port pins of or otherwise governable via the controller 1001 (FIG. 1), for example, may each correspond to the electronic location assigned to a specific physical location (e.g., locations 2002). In one example implementation according to various aspects of the present disclosure, a port pin corresponding to a particular location have corresponding computer readable data 220 within a configuration file 222 structured as depicted in FIG. 13. For each line of the configuration file 220 as shown in FIG. 13, the left hand side of the equals sign may correspond to a location 2201 (FIG. 11), and on the right hand side of the equals sign may be a value representing or otherwise corresponding to the port pin accessed by the controller (e.g., controller 1002 of FIG. 1). However, in other example implementations, other methods and/or features of storing the aforementioned data may also be utilized, such as via storage and/or access of this or other data in a data repository, as variables in software, or any other method or features familiar to those skilled in the art.

Figure 14:
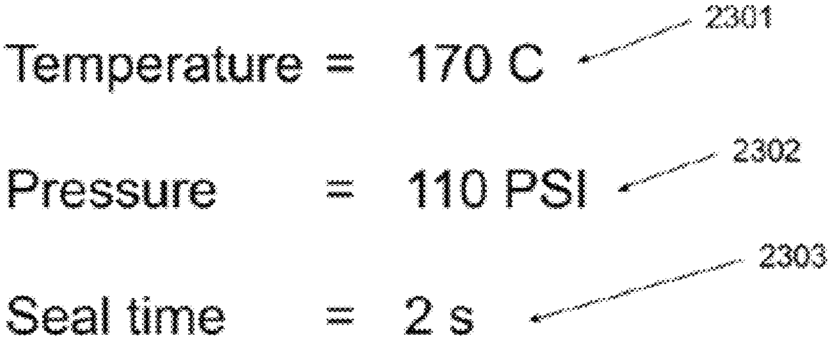
FIG. 14 is a table including a plurality of example parameters for use in production of bags used for sterilization, according to various aspects of the present disclosure.

Other parameters that may be used for bag production include those relating to the creation of the seal. Various such example parameters depicted in FIG. 14 may include some combination of the temperature of the hot bar (e.g., hot bar 1605 of FIGS. 7 and 10), the bag material, the pressure applied by the compression bar 1603, and the length of time for which the desired sealing pressure is maintained, or other variable parameters, for example. In one example as shown in FIG. 14, the temperature of the hot bar 1605 (FIG. 10) may be set to a specific temperature degree 2301. In another example, the user may select the bag material, wherein the temperature of the hot bar (e.g., hot bar 1605 of FIG. 10)

may be determined by reference to a lookup table containing corresponding suggested sealing temperatures or similarly operating other method employed to determine the appropriate temperature. In yet another example, the pressure (e.g. pressure value 2302 shown in FIG. 14) applied by the compression bar (e.g., compression bar 1603 of FIGS. 7 and 9) may be set by a user or determined by the system, for example, based on parameters of the bag material/type involved. For example, the user may select the bag material and a lookup table containing corresponding pressures may be employed. Further, in one example, the length of time (e.g., seal time value 2303 shown in FIG. 14) for which the desired sealing pressure is maintained may be set by a user or determined by the system.

Figure 15:
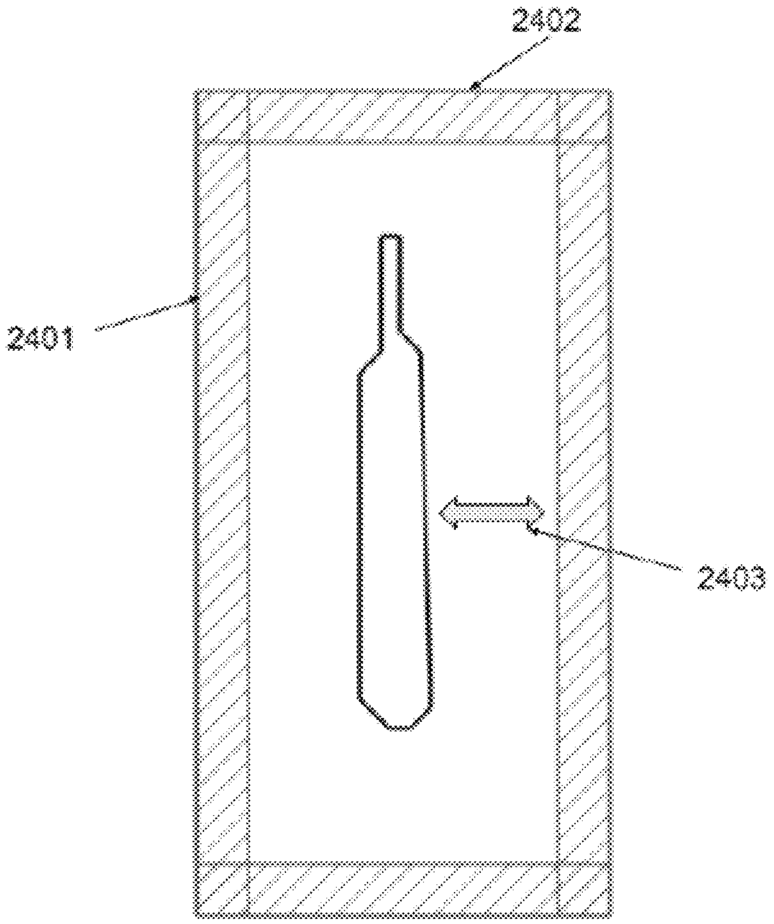
FIG. 15 is an example of an instrument that has been placed within and sealed into a tubing according to various aspects of the present disclosure.

Additionally, parameters that size bags appropriately may also need to be utilized and/or accounted for with regard to various operations and/or functions, in accordance with various aspects of the present disclosure. In one example, an instrument that has been placed within and sealed into tubing (e.g., tubing 1005 of FIG. 1) is representatively illustrated in FIG. 15. A formed bag may be configured to include a width of approximately 3 inches, for a particular instrument in one example; however the useable width of the bag may be lessened by the width of a factory made seal 2401. Further, the length of the bag may be configured to be approximately 6 inches, for the particular instrument in this example; however the useable length may also be lessened by the width of the bagmaker seal 2402. The useable length of the bag may be further reduced by required padding between the top and bottom of the instrument and the seals. Additionally, a length of bag is in some cases desired past the seal opposite the contents of the sealed volume. The extra length beyond the seal may allow for easier opening of the sealed pouch. In addition, in one example, an amount of padding may be included within the formed bag between the packaged instrument and the seals 2403.

Figure 16:
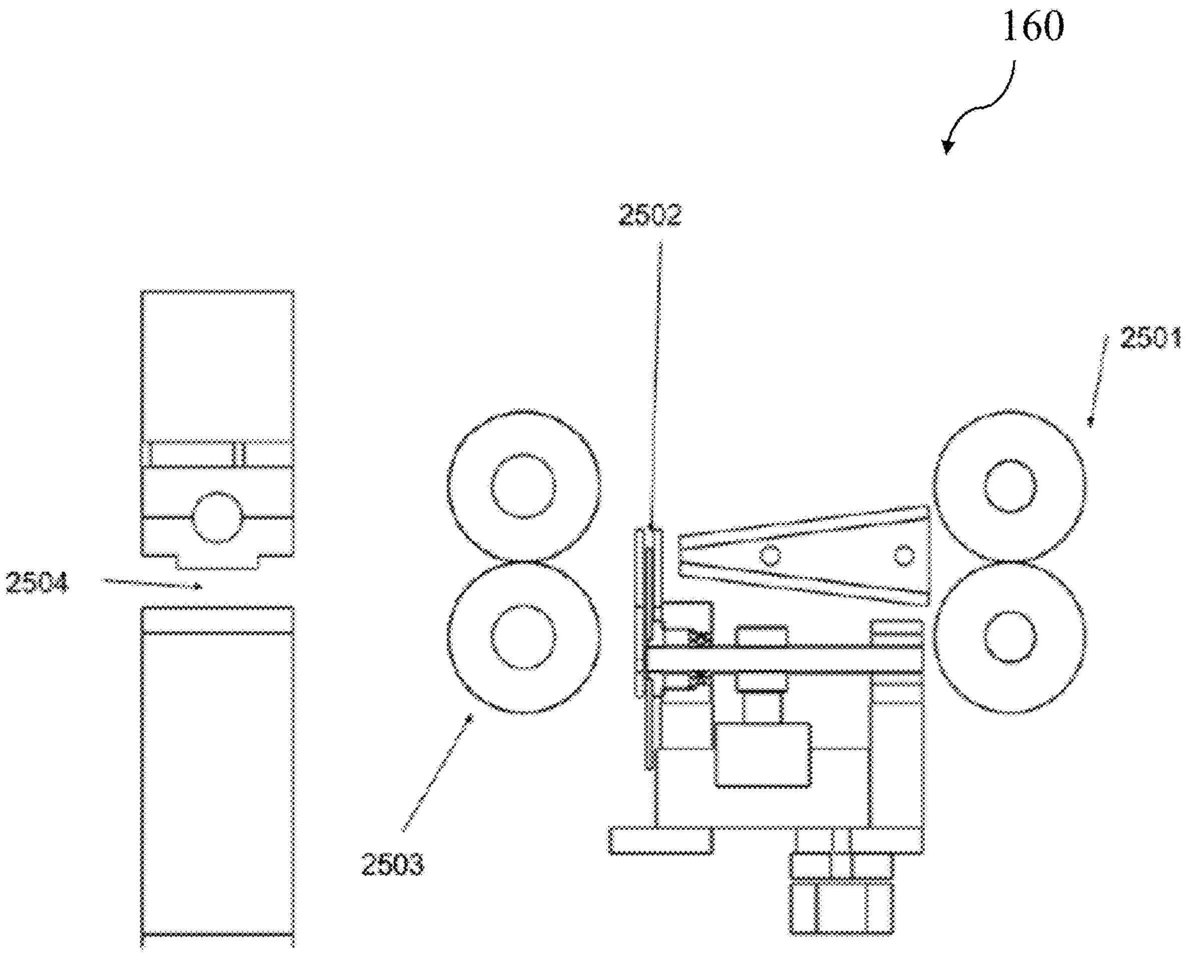
FIG. 16 is a cross-sectional view of an example bagmaker, according to various aspects of the present disclosure.

When forming a bag for the packaging of devices that may be sterilized, such as medical instruments, other parameters related to the dimensional characteristics of the bag production device may also be considered and/or accounted for. For example, according to various aspects of the present disclosure, FIG. 16 representatively illustrates a cross sectional view of various features 160 of an example bagmaker (e.g., bagmaker 100 of FIGS. 1 and 2), wherein such features 160 may include module roller rolls 2501, a cutter blade 2502, secondary roller rolls 2503, and a heat sealer face 2504. In one example, as a first stage in the production of a bag, a first end of a roll of tubing (e.g., tubing 1005 of FIG. 1) may be engaged by the module roller rolls 2501, at some distance away from the cutter blade 2502. Following, the end of the bag engaged by the module roller rolls 2501 may be drawn a distance to sealer 2504, wherein the distance to sealer 2504 may be defined as the distance from the starting location of the tubing in the module roller rolls 2501 to a position such that the end of the tubing may be at least slightly past the far edge of the sealer face 2504 (e.g., left side of sealer face 2504 as shown in FIG. 16). After the tubing has been cut (e.g., via cutter blade 2502), the cut portion of the tubing for forming a bag may be ejected from the bag production device (e.g., bagmaker 100 of FIGS. 1 and 2). Thus, the cut end of the tubing may move an eject distance, wherein the eject distance may be defined as at least the distance from the cutter blade 2502 to a point where the bag is no longer engaged by the secondary roller 2503. Additionally after the tubing has been cut, it may be desirable for the remainder of the tubing drawn through the module roller rolls 2501 to be retracted from the path of the cutter blade 2502. Consequently, the end of the remaining tubing extending through the module roller rolls 2501 may be moved a retract distance, wherein the retract distance may be defined as the distance from the cutter blade 2502 to a point where the remaining tubing is still engaged by the module roller rolls 2501.

Figure 17:
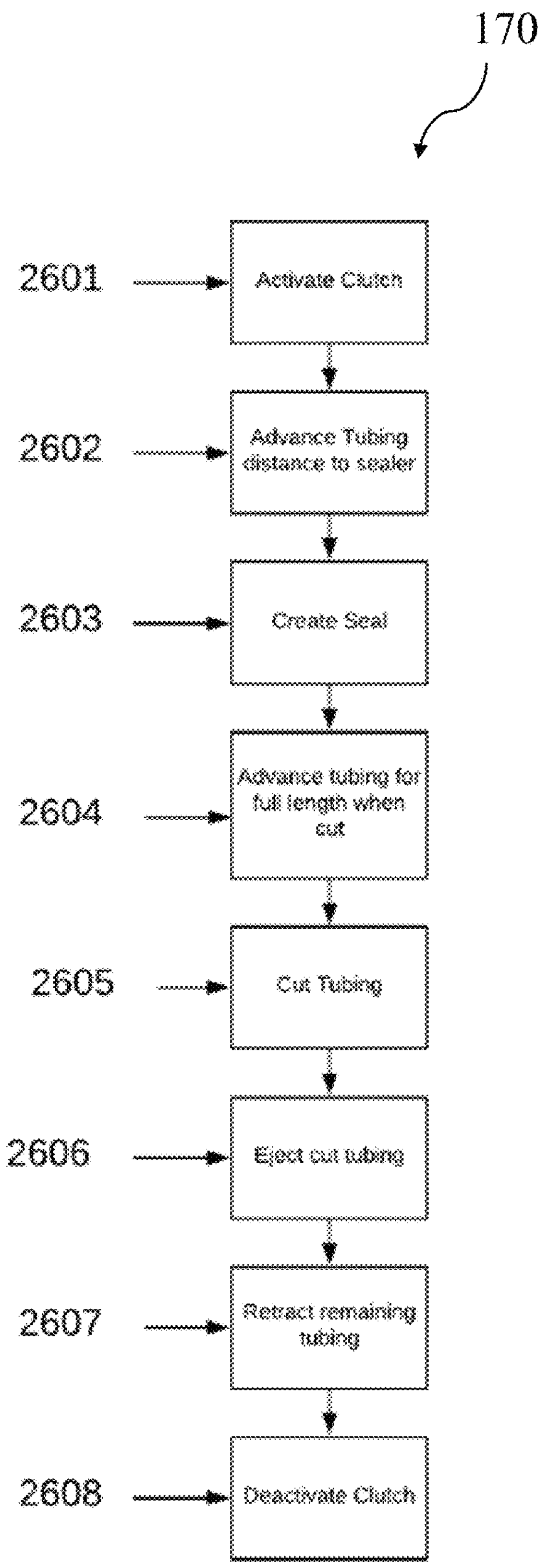
FIG. 17 is a flow chart depicting a method for the production of a single bag implementing an example bagmaker, according to various aspects of the present disclosure.

FIG. 17 shows various elements of a flow chart 170 for an example method of production of a bag by a bagmaker, in accordance with aspects of the present disclosure. At 2601, the clutch corresponding to the desired bag width may be activated. At 2602, the activated module and second roller may advance the tubing to the sealer. Once the tubing 1005 (FIG. 1) is positioned by the activated module and advance via the second roller, a seal may be created, such as by a heat sealer. At 2604, the tubing 1005 (FIG. 1) may be advanced to its full length for being cut. For example, along the lines as shown in FIG. 16, the activated module and second roller may further advance the tubing such that the length of the tubing from the path of the cutter to the far end of the seal is approximately equal to the total desired bag length. For example, the desired bag length may include a length determined based on an object to be contained within the bag, such as a surgical instrument. The bag length may be determined based on one or more dimensions for the surgical instrument, which may be received, for example, from an instrument inventory system. For additional instrument inventory system related details, see, e.g., Applicant's co-pending U.S. patent applications, each of which is hereby incorporated by reference herein: U.S. patent application Ser. No. 14/620,084 titled "Instrument Inventory System and Methods" having inventors Russell BAKER, et al., filed Feb. 11, 2015; U.S. patent application Ser. No. 15/068,420 titled "System and Methods for Packaging Instruments" having inventors Russell BAKER, et al., filed Mar. 11, 2016; and U.S. patent application Ser. No. 16/397,178 titled "Object Recognition and Data Retrieval System" having inventors Russell BAKER, et al., filed Mar. 29, 2019.

In an aspect of the present disclosure, the instrument inventory system may include at least one user interface, at least one instrument interface, an instrument processor and a database storing instrument records. The instrument inventory system may include a training function that enables the system to create a data record, such as for new instruments when the system encounters new instruments. The at least one instrument interface may include one or more of an identification reader that is able to read instrument identifications, such as labels and electronic tags, a physical data interface that is able to identify the instrument through physical movement of the instrument, and/or a visual instrument identification system. In some example implementations, the instrument system may receive sensor data. In some example implementations, the instrument system may also receive user entered data. The instrument processor may analyze the data associated with an instrument being processed and the instrument system may add to instrument data in the database.

Aspects of the present disclosure may include an object recognition and data retrieval system and/or methods of operation thereof. An example implementation of an object recognition and data retrieval system may be provided that uses a digital representation of a physical object to retrieve data related to that object. For example, the system may compare stored digital representations of physical objects to an object under examination (e.g., imaging/image feature recognition) to determine the type of object. Once the type is identified, data related to the object may be retrieved. The object recognition and data retrieval system may example, be configured to create and manipulate specific pieces of the data retrieved. The object recognition and data retrieval system may be configured to share object data with other, target storage systems and/or other features. The shared object data may be used by the target storage system to store the objects, for example.

Another aspect of the present disclosure may include a system for packaging instruments. The system for packaging instruments may include an input for receiving instrument identification data. The system may further include an instrument processor coupled to the input. The instrument processor may include a database and an instrument analyzer. The database may store instrument type data, instrument packaging data and package labeling data. The instrument analyzer may identify instrument type and determine instrument packaging and labeling using data stored in the database, for example. The instrument analyzer may further determine instrument handling, packaging and labeling instructions. An output coupled to the instrument processor may send the handling, packaging and labeling instructions to at least one external device. The at least one external device in various implementations may include a labeler, a packager and an instrument transfer device.

Once positioned via the advance of 2604, at 2605, the tubing may be cut. For example, the cutter may be employed to sever the tubing at the determined location. At 2606, the tubing 1005 (FIG. 1) may be ejected. For example, the second roller may eject the just created bag portion of the tubing 1005 by advancing the tubing 1005 the eject distance. At 2607, the remaining, uncut portion of the tubing 1005 may be retracted. For example the module roller rolls may retract the uncut tubing 1005 by drawing the tubing 1005 back a retract distance. Though the above elements 2606 and 2607 are described sequentially above, such elements may occur contemporaneously or in reverse order, for example. At 2608, the clutch may be deactivated.

Figure 18:
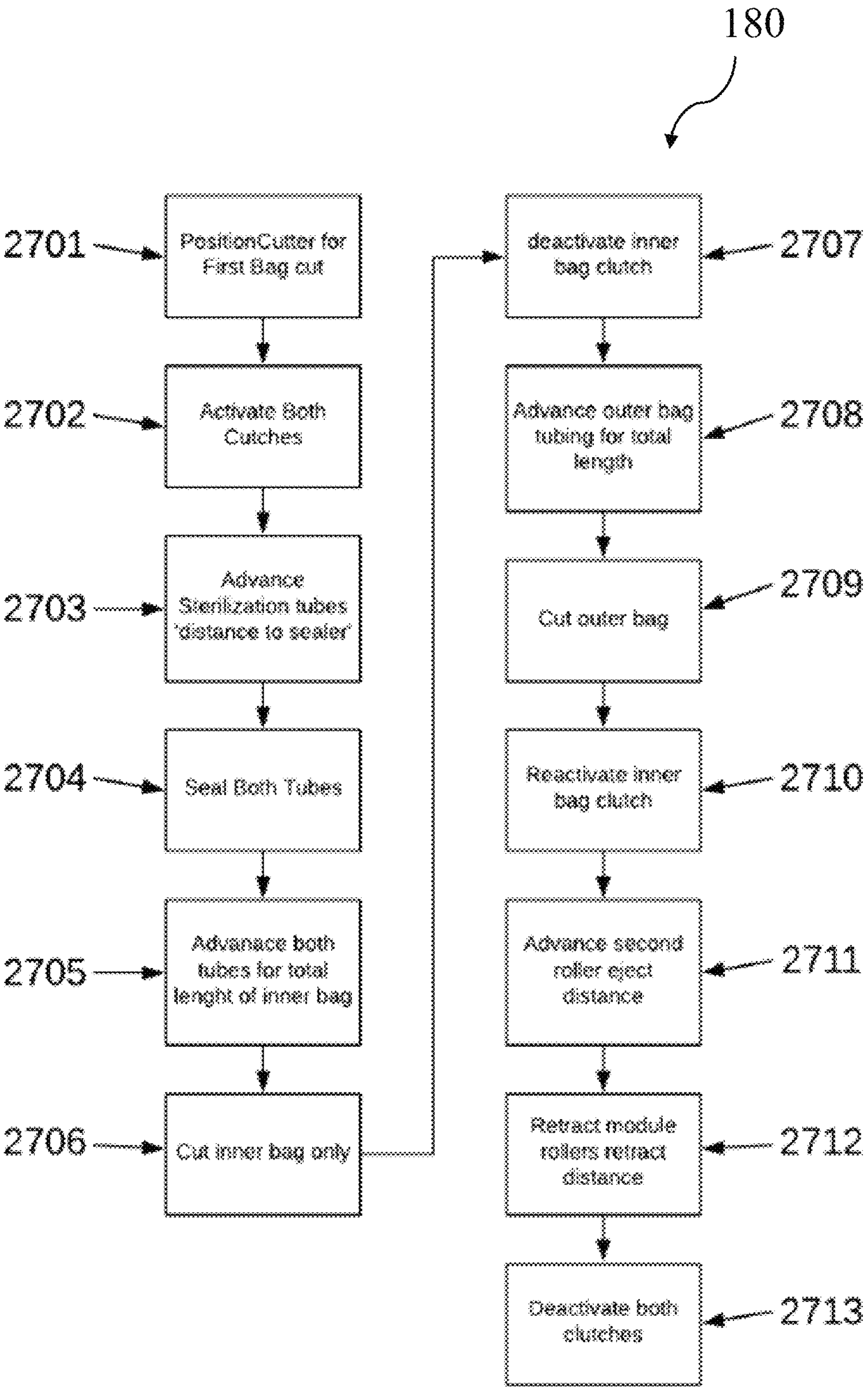
FIG. 18 shows various elements of a flow chart for an example method of production of a bag by a bagmaker, in accordance with aspects of the present disclosure.

FIG. 18 shows various aspects of a flow chart 180 for an example method of bag production, wherein a double bagging technique may be employed. Specifically, double bagging may refer to placing an item inside of a first pouch, wherein the item inside the first pouch and the first pouch are both then additionally placed within a second pouch. At 2701 of flow chart 180, the cutter may be positioned adjacent to the module of the inner bag, yet distal to the outer bag. At 2702, the clutches for both inner and outer bags may activate. At 2703, the second roller and both activated module rollers may advance both bags the appropriate distance for operation of the heat sealer. At 2704, the heat sealer may contemporaneously seal both bags. At 2705, the second roller and both activated module rollers may further advance both sizes of tubing 1005 (FIG. 1) such that the length of tubing 1005 (FIG. 1) from the path of the cutter to the far end of the seal made previously is approximately equal to the desired length of the inner bag. At 2706, the cutter may traverse a distance such that it cuts the inner bag only, stopping the circular blade assembly before it encounters the second bag. At 2707 the clutch for the inner bag may deactivate. At 2708, the second roller and module roller corresponding to the outer bag may advance the outer bag tubing 1005 an additional length factor sufficient for the inner bag to fit inside of the outer bag. Should the additional length factor equal or exceed the eject distance, the first bag may also eject at 2708. At 2709, the cutter may cut the second bag. At 2710, the clutch for the module roller of the inner bag may activate. With both clutches activated once again, the second roller may eject the second bag at 2711, and the activated modules may retract both bags at 2712. The flow chart 180 may conclude with the clutches for both bags deactivating 2713.

Figure 19:
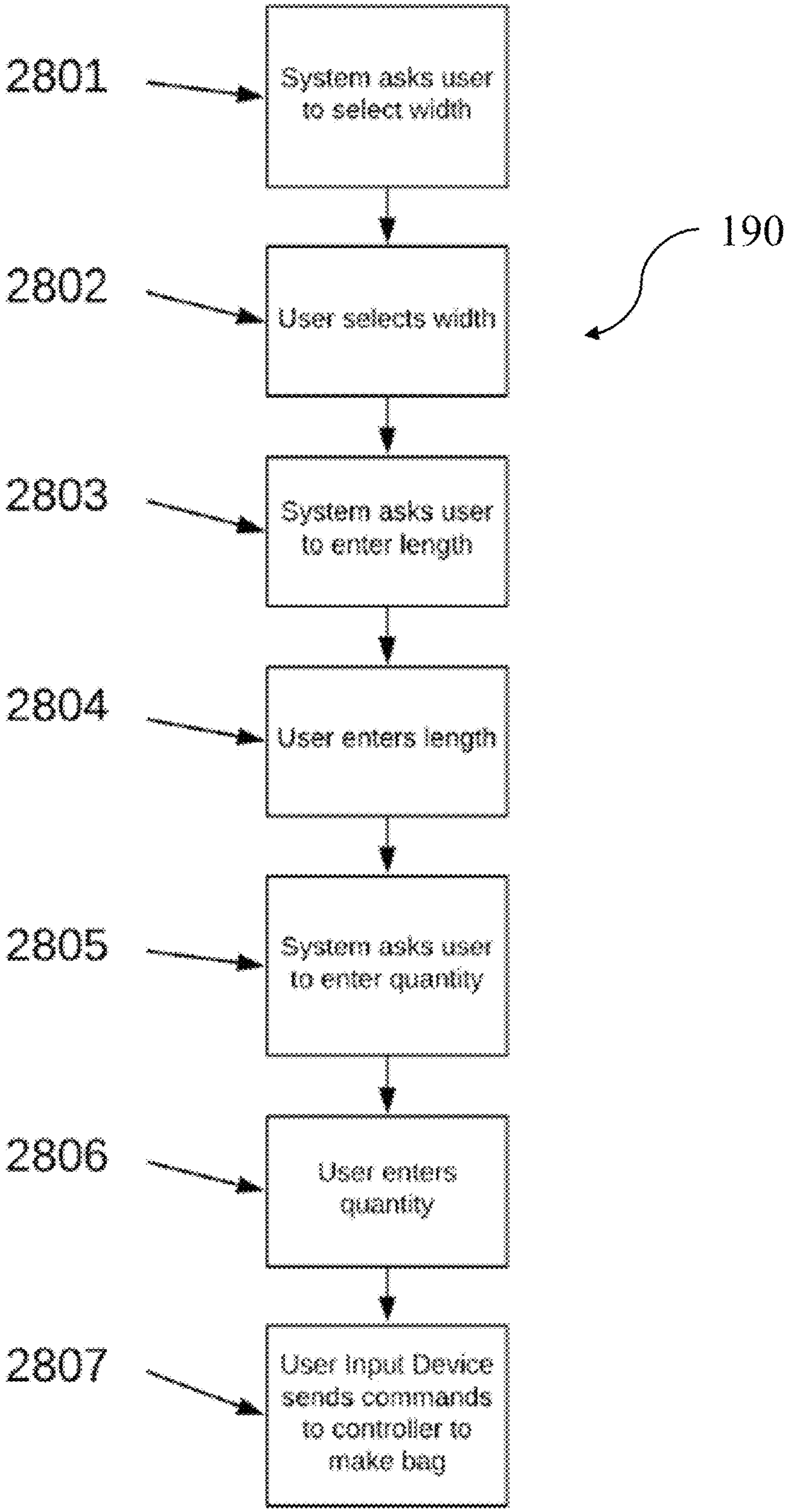
FIG. 19 is a flow chart illustrating a method for producing bags including an input device configured for receipt of input commands, according to various aspects of the present disclosure.

FIG. 19 shows a flow chart 190 of an example method 190 for producing bags from a tubing stock, wherein the method may include an input device configured to input commands from a human user, according to various aspects of the present disclosure. In one example, the system may comprise a bagmaker, wherein the bagmaker may include a command issuing device configured for selective user input. The command issuing device may thereby allow for human control of the system. Human interaction with the user input device may generate content or other similar information for a plurality of commands (e.g. the commands 1003 of FIG. 1) which may be interpreted by a controller (e.g. the controller 1001 also of FIG. 1). In one example, the user input device may be incorporated into the body of the bag production device and may include an input or output device such as buttons, keypad, touch screen, LCD screen, microphone or other voice input, or any combination thereof. To begin the example method 190 as shown in FIG. 19, a message may be displayed to the user requesting the user select the desired bag width 2801. The system may then be configured to display one or more widths that have been installed and configured. At 2802, the user may select the desired width. Next, at 2803, the system may display a message to the user requesting the user enter the desired bag length. At 2804, the user may enter the desired length of the bag. At 2805, the system may request that the user enter a quantity value for the number of bags to produce. At 2806, the user may enter a quantity value. Upon conclusion of the bag criteria entry, the user input device may send commands to the controller to make a bag 2807, for example, in accordance with aspects of the bag production processes described in FIGS. 17 and 18.

Figure 20:
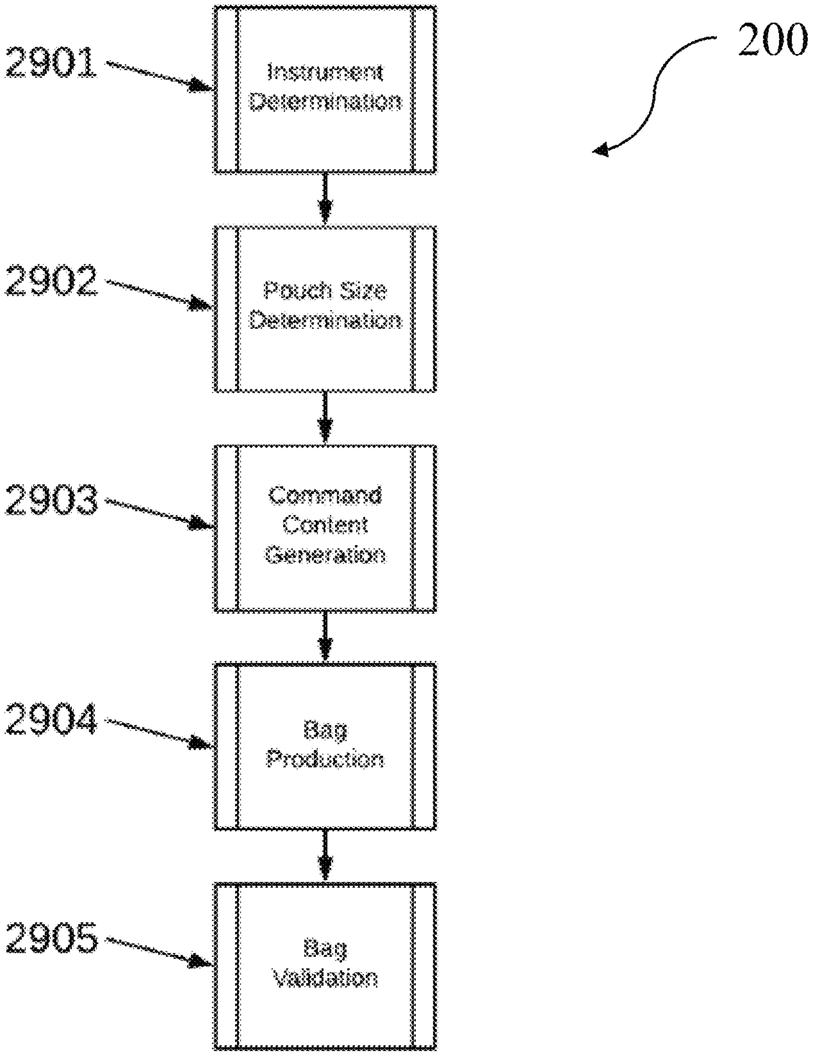
FIG. 20 is a flow chart illustrating a method for automating peel pouch production, according to various aspects of the present disclosure.

FIG. 20 shows a flow chart 200 of an example method for automating peel pouch production 200. At 2901, the item, such as an instrument or other similar devices, may be determined. Following, at 2902, the required pouch size may be determined. At 2903, the content for the commands sent to the controller from the command issuing device may be generated from the desired pouch size. Then, at 2904, the bag may be produced. Finally, at 2905, the successful production of an appropriately sized bag may be either confirmed or negated.

Figure 21:
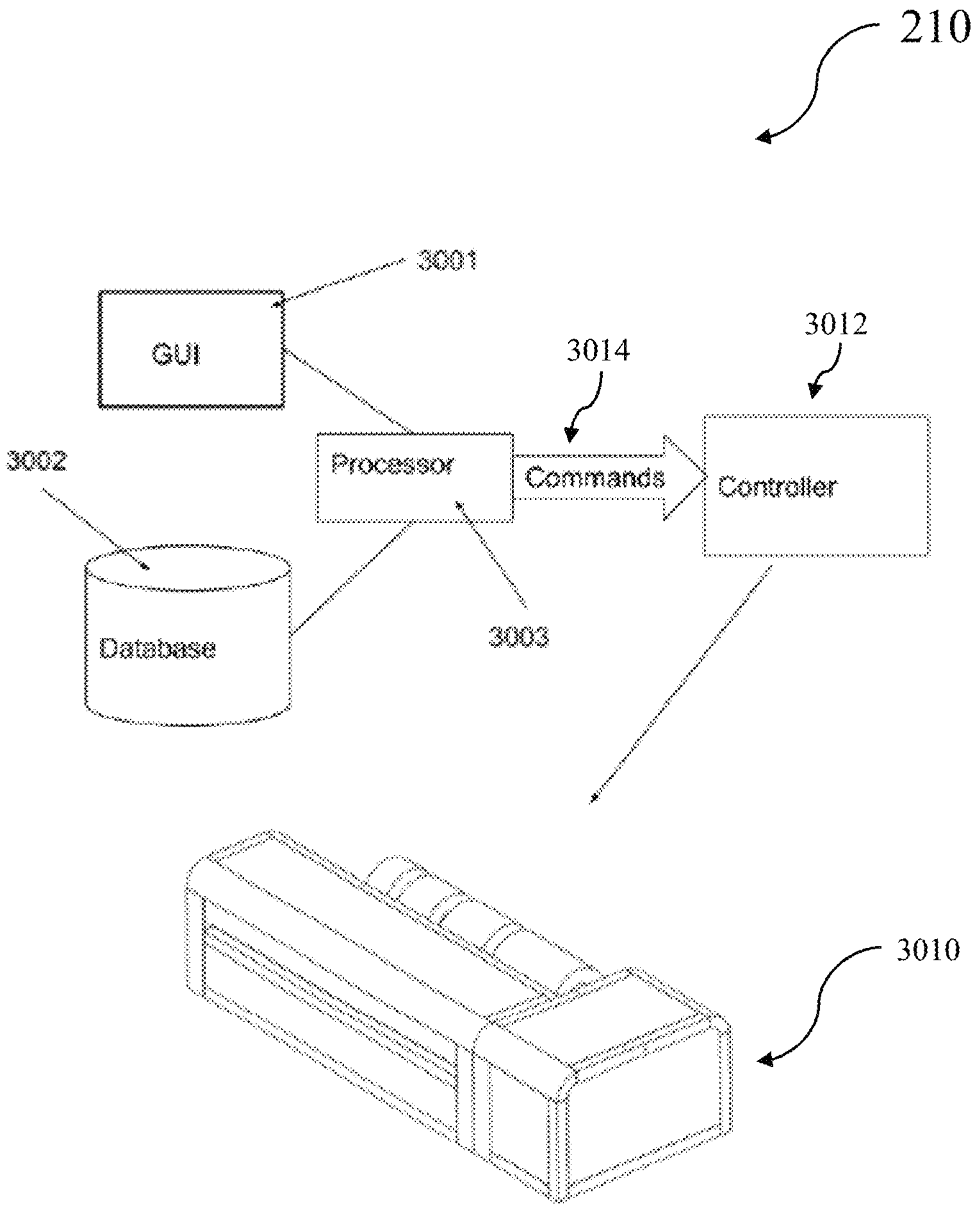
FIG. 21 is a flow chart illustrating a method for automating the packaging of items, such as surgical instruments, into bags, peel pouches, or pouches for sterilization, according to various aspects of the present disclosure.

FIG. 21 shows a representative diagram of various aspects of a system 210 for operating an example bagmaker for automating the packaging of items, such as surgical instruments, into bags or pouches, in accordance with aspects of the present disclosure. The system 210 for operating a bagmaker 3010 in FIG. 21 is similar to features relating to operation of the bagmaker 100 of FIG. 1, but may include additional features, such as a Graphical User Interface (GUI) 3001, wherein the GUI 3001 may be configured for accepting user input and displaying system messages. Further, the GUI 3001 may also interoperate with a data repository 3002 for storing system data, and a processor 3003 for issuing commands 3014 to a controller 3012, wherein controller 3012 may be similar to the controller 1001 of FIG. 1.

Figure 22:
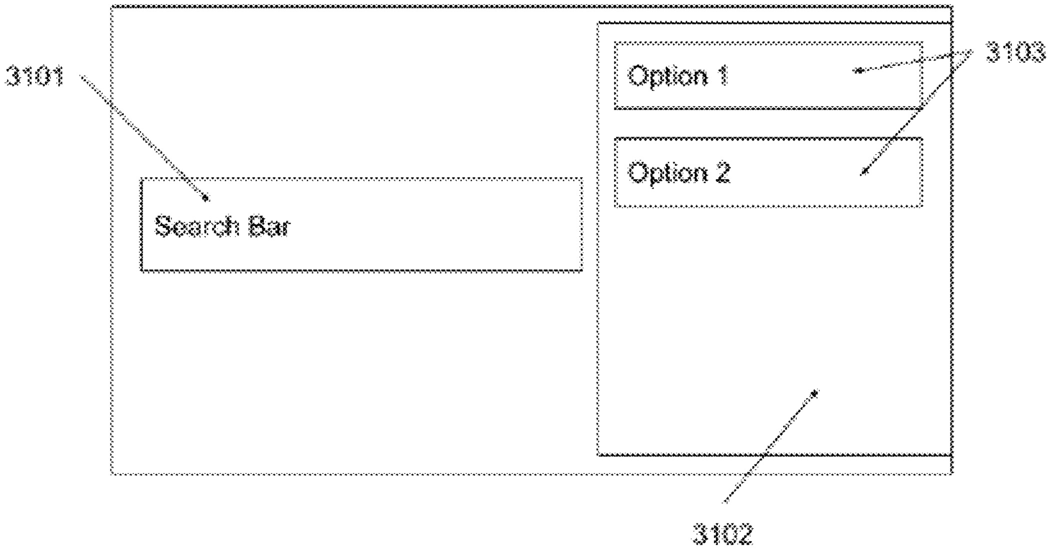
FIG. 22 is an example Graphic User Interface interoperable with an example bagmaker, according to various aspects of the present disclosure.

FIG. 22 shows various features of one example GUI interface screen for the GUI 3001 of FIG. 21, wherein such features may include a plurality of search criteria, for example. In one example implementation, search criteria may be entered using an external keyboard, touch screen keyboard, voice activation, or any other suitable devices and/or methods for submitting text to a computer. Following, search results may be shown in the matching results area 3102, including one or more match buttons 3103, wherein the match buttons 3103 may provide selectable results from the search. One or more of the match buttons 3103, for example, may be selected with a mouse click, touch screen button press, or other input; or, for example, the search results in the match buttons 3103 may be numbered to allow for selection using a numeric keypad or other numeric selection method or features.

Figure 23:
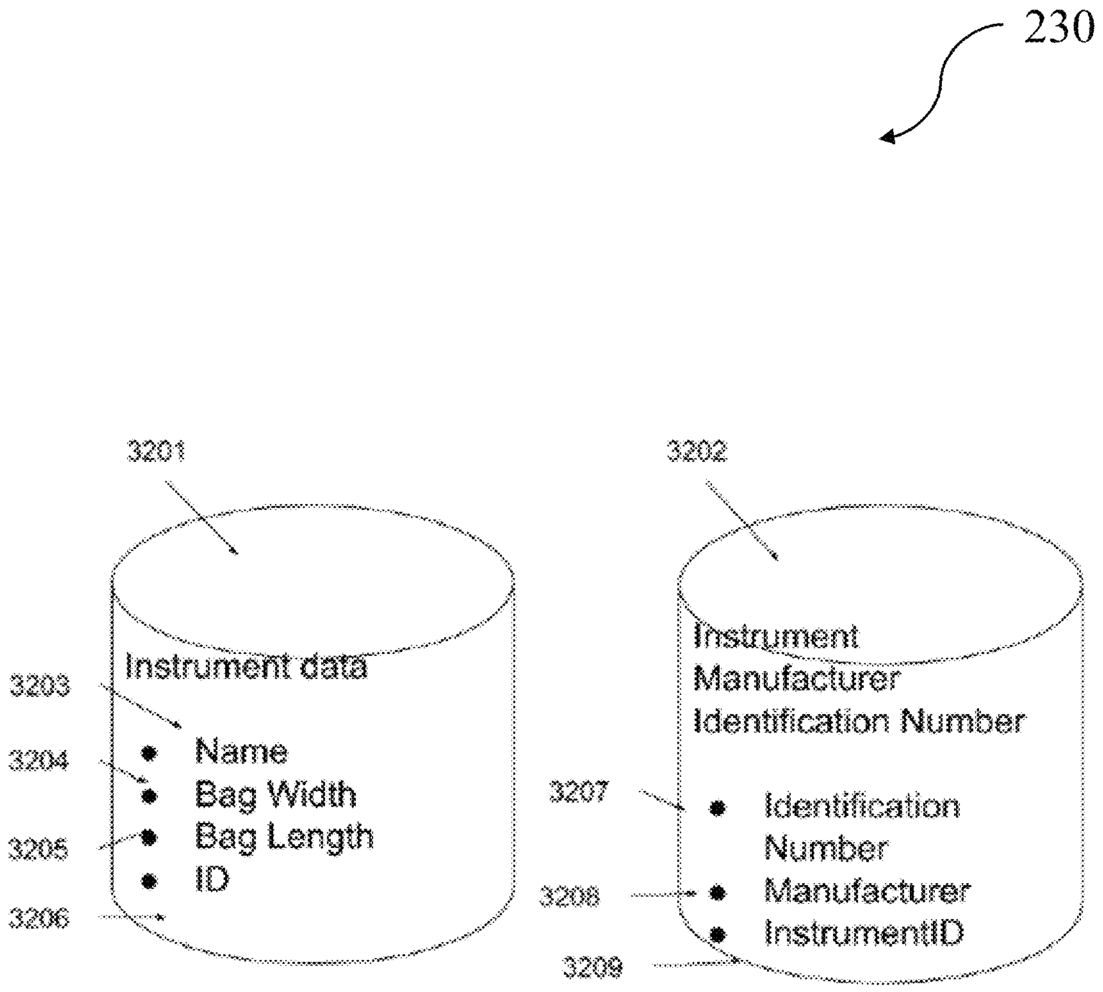
FIG. 23 is an example data repository configuration, for use in accordance with various aspects of the present disclosure.

FIG. 23 representatively illustrates various features of an example database configuration 230 for use in accordance with aspects of the present disclosure. Database 230 may utilize a database management system, such as MySQL made by Oracle Corporation of Cupertino, California; however, other database management systems may be used in other examples. FIG. 23 depicts two data repositories 3201, 3202, including a first data repository 3201 configured for item and/or instrument data, and a second data repository 3202 configured for Instrument Manufacturer Identification Numbers (IMIN). The instrument and/or item data repository 3201 may include, for example, a first column 3203 for instrument and/or item name, a second column 3204 for preferred bag width, a third column 3205 for preferred bag length, and a fourth column 3206 for instrument and/or item identification (ID). In an alternative example, any number of columns (or other suitable data organizational structure) may be implemented to account for a plurality of information. The IMIN data repository 3202 may be configured to include, for example, a plurality of columns, such as a first column 3207 for identification number, a second column 3208 for manufacturer identification information, and a third column 3209 for instrument and/or item identification information, such that column 3209 may be configured to correlate the IMIN data repository 3202 entry to an instrument type in the instrument and/or item data repository 3201.

The example implementations of the system shown in FIG. 23 may be used in accordance with the flow chart illustrated in FIG. 20, for example.

Figure 24:
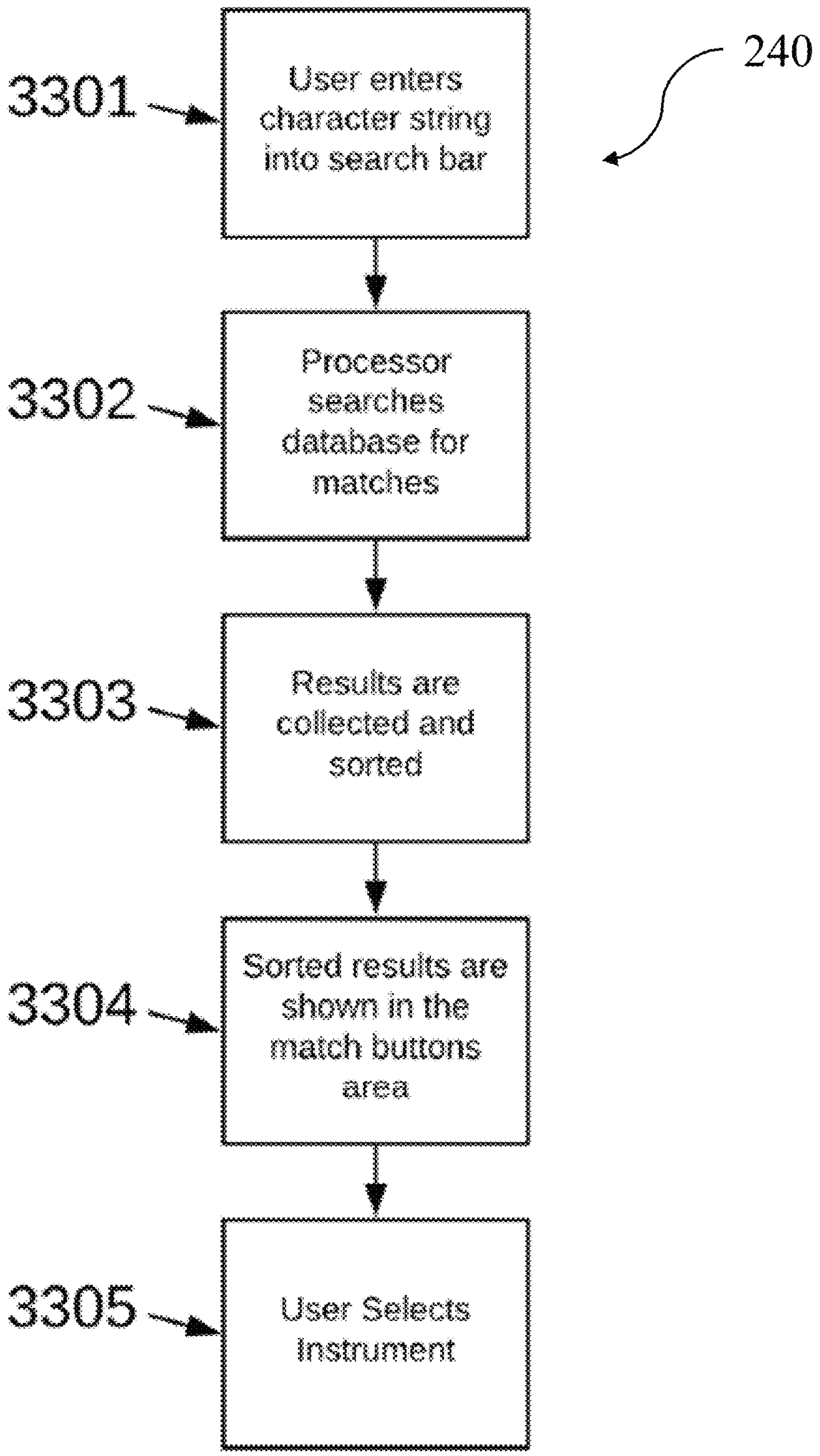
FIG. 24 is a flow chart illustrating a method search and selection process, according to various aspects of the present disclosure.

A flow chart 240 depicting an example method for carrying out an example search and select process is shown in FIG. 24. Flow chart 240 may begin at 3301, wherein the user may enter a sequence of characters into the search bar 3101. At 3302, as each character is entered, a processor (e.g., processor 3003 of FIG. 21) may search an instrument and/or item data table (e.g., instrument table 3201 of FIG. 23) for instrument and/or item names with matching character sequences. However, in other example implementations, the processor may simultaneously search an IMIN table (e.g., IMIN table 3202 of FIG. 23) for identification numbers containing the character sequence. Instruments and/or items that match the text sequence may be collected and sorted 3303. In one example, sorting may be alphabetical; however, in other examples, sorting by frequency may be implemented. In yet another example, sorting order may be determined by frequency of use, by time of day, or by some combination thereof. Following, at 3304, sorted instruments and/or items may be presented (e.g., in match buttons area 3102 of FIG. 22). Finally, at 3305, the user may select an instrument and/or item type, wherein in one example, the selected instrument and/or item may be a desired instrument and/or item type.

Figure 25:
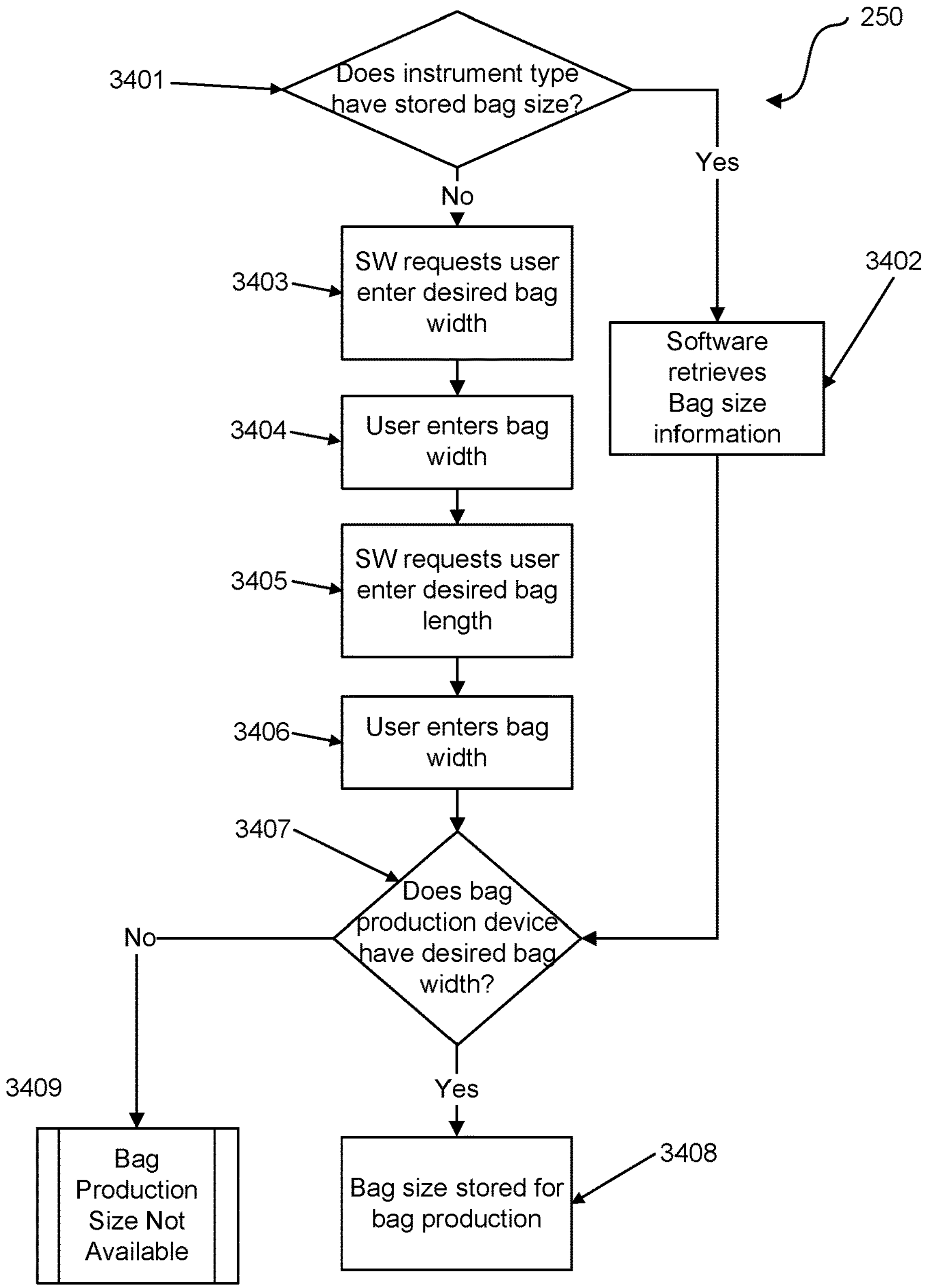
FIG. 25 is a flow chart illustrating a method for determining bag size for a bag produced by an example bagmaker, according to various aspects of the present disclosure.

FIG. 25 shows a flow chart 250 depicting an example method for bag size determination. The method shown in flow chart 250 may commence at 3401, wherein a determination may be made (e.g., via software) as to whether the selected instrument and/or item type has a preferred bag size stored in the instrument and/or item table. If it is determined that the selected instrument and/or item type has a preferred bag size stored in the instrument and/or item table, the data may then be retrieved 3402 (e.g., via software). However, if it is determined at 3401 that the selected instrument and/or item type does not have a stored bag size, at 3403, a request may be made for the desired bag width. For example, the processor may command the GUI to display a numeric key pad along with a pop-up requesting the user enter a desired bag width. Following, at 3404, a value for the desired bag width may be entered. At 3405, a value for the desired bag length may be requested. For example, the processor may command the GUI to display a numeric key pad along with a popup requesting the user enter a desired bag length, wherein following at 3406, a value for a bag length may be entered. At 3407, a determination may be made as to whether the bagmaker has a tube width within the desired range. If the bagmaker does have a tube width within the desired width range, the determined width and entered length may be stored for use in the bag production 3408. If the bagmaker does not have at tube width within the desired width range, the bag production size is determined not to be available 3409.

Figure 12:
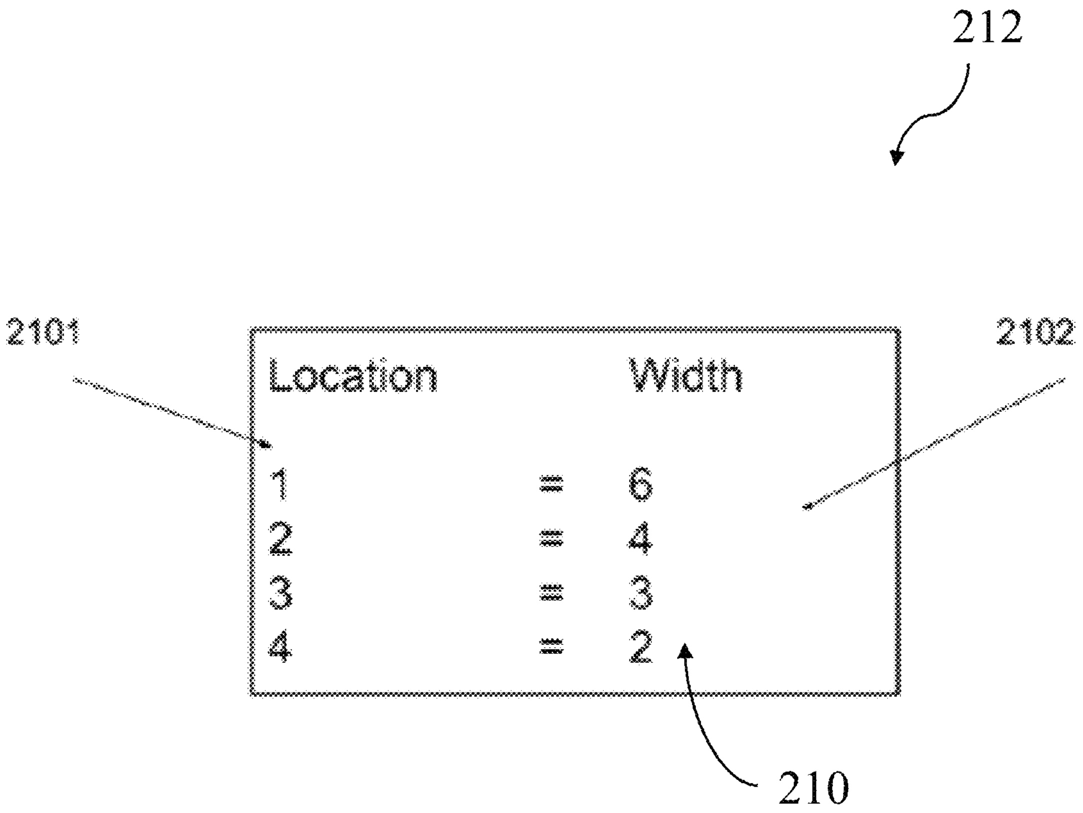
FIG. 12 shows an example port pin corresponding to a particular location maintained as computer readable data within a configuration file, according to various aspects of the present disclosure.
Figure 26:
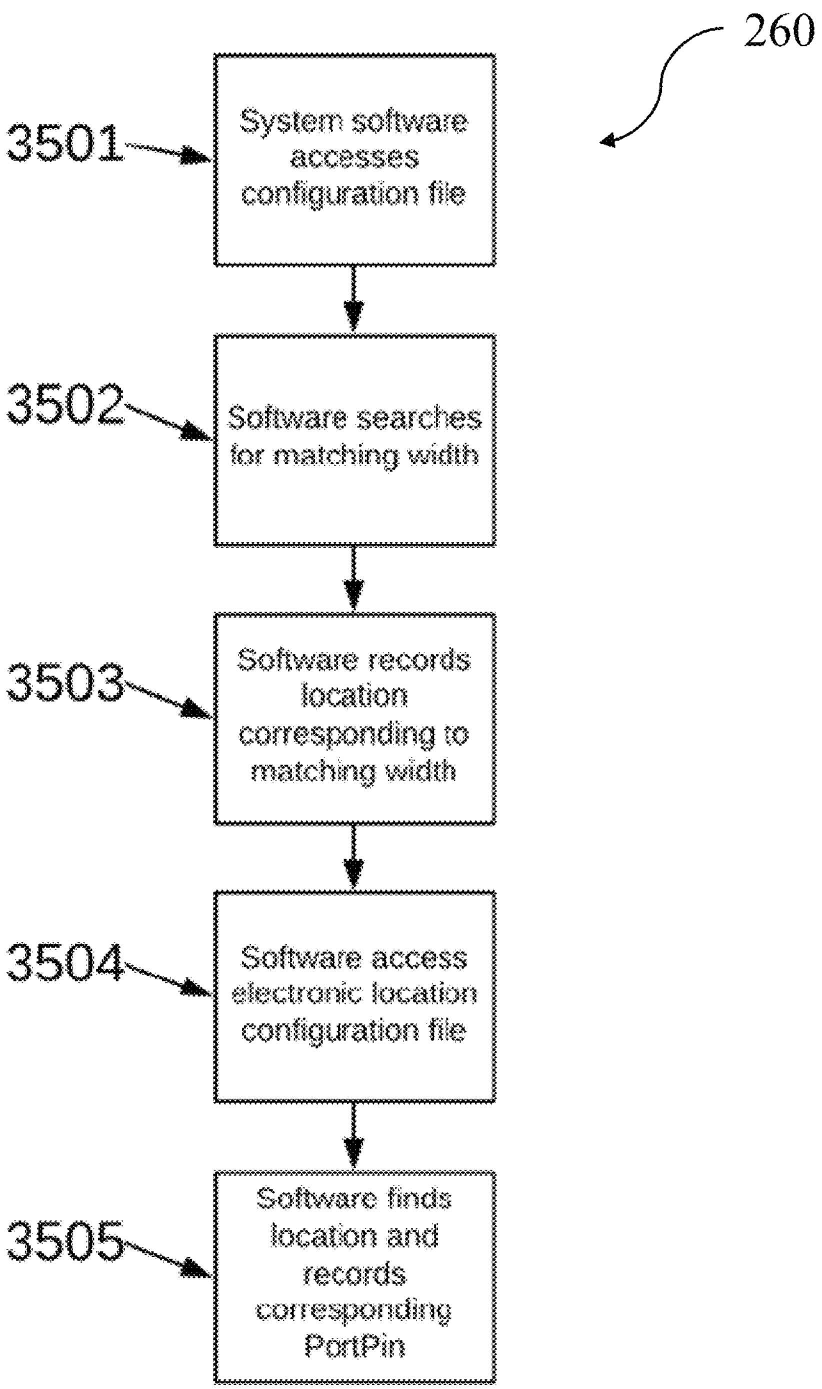
FIG. 26 is a flow chart illustrating a method for generating the appropriate content for the controller commands with regard to the desired bag size for a bag to be produced by an example bagmaker, according to various aspects of the present disclosure.

FIG. 26 shows a flow chart for an example process 260 for generating the appropriate content for the controller commands from the desired bag size. In one example, the bag module rollers may share a motor. Further, for example, module rollers may have an electromagnetic clutch, wherein the electromagnetic clutch may be activated to harness the rotary motion of the shared motor. For this example, at 3501, the software may refer to a roll location configuration file, such as the roll location configuration file as depicted in FIG. 11. At 3502, the software may search the roll location configuration file for a width corresponding to the desired bag width. Upon finding the matching width, the corresponding location may be recorded 3503. Following, at 3504, the software may access the location of a port pin configuration file, such as the port pin configuration file as depicted in FIG. 12. Next, at 3505, the software may retrieve the port pin corresponding to the recorded location. To employ the module roller possessing the desired bag width, a command may be sent to the controller which activates the retrieved port pin.

Figure 27:
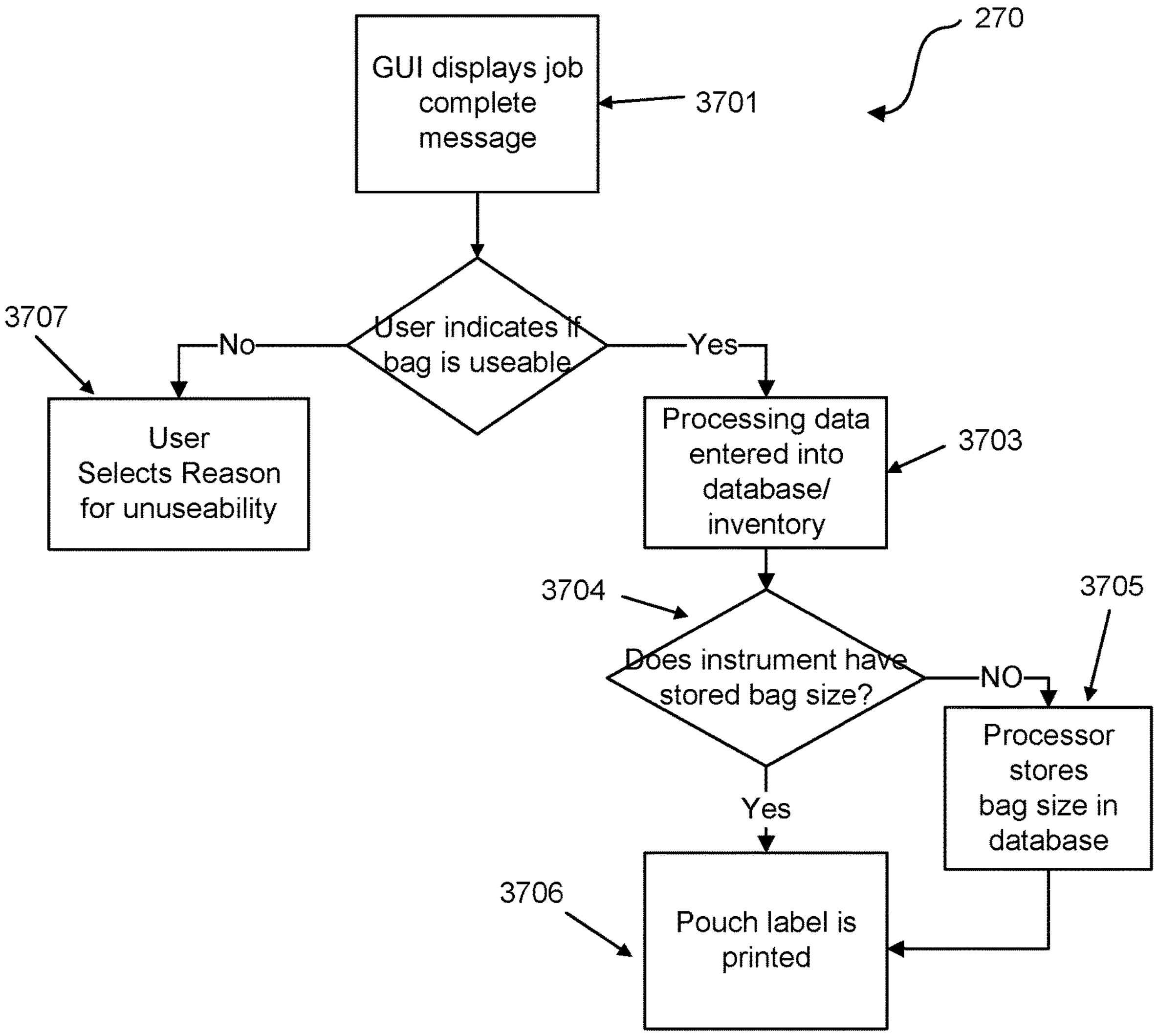
FIG. 27 is a flow chart illustrating a method describing an example process of bag validation, according to various aspects of the present disclosure.

According to various aspects of the present disclosure, FIG. 27 is a flow chart 270 illustrating an example method for a process of bag validation. As shown in FIG. 27, at 3701, a message indicating that a job is completed may be displayed. At 3702, an input may be made as to whether the produced bag is useable. If the bag is useable, the method may then proceed to 3703, wherein the data processing for the just processed item and produced bag may be stored into the data repository 3703 and inventory may be updated to reflect the completed product. If at 3702 a determination is made that the produced bag is not usable, a reason for unusability may be input 3707. At 3704, a determination may be made as to whether the just processed item type has values for stored bag size in the data repository. If the just processed item type does not have values for stored bag size in the data repository, the method may proceed to 3705, wherein the just used and validated bag dimensions may be stored in the data repository. In one example, following a successful bag production, a label may be printed for placement upon the just produced pouch 3706.

Figure 28:
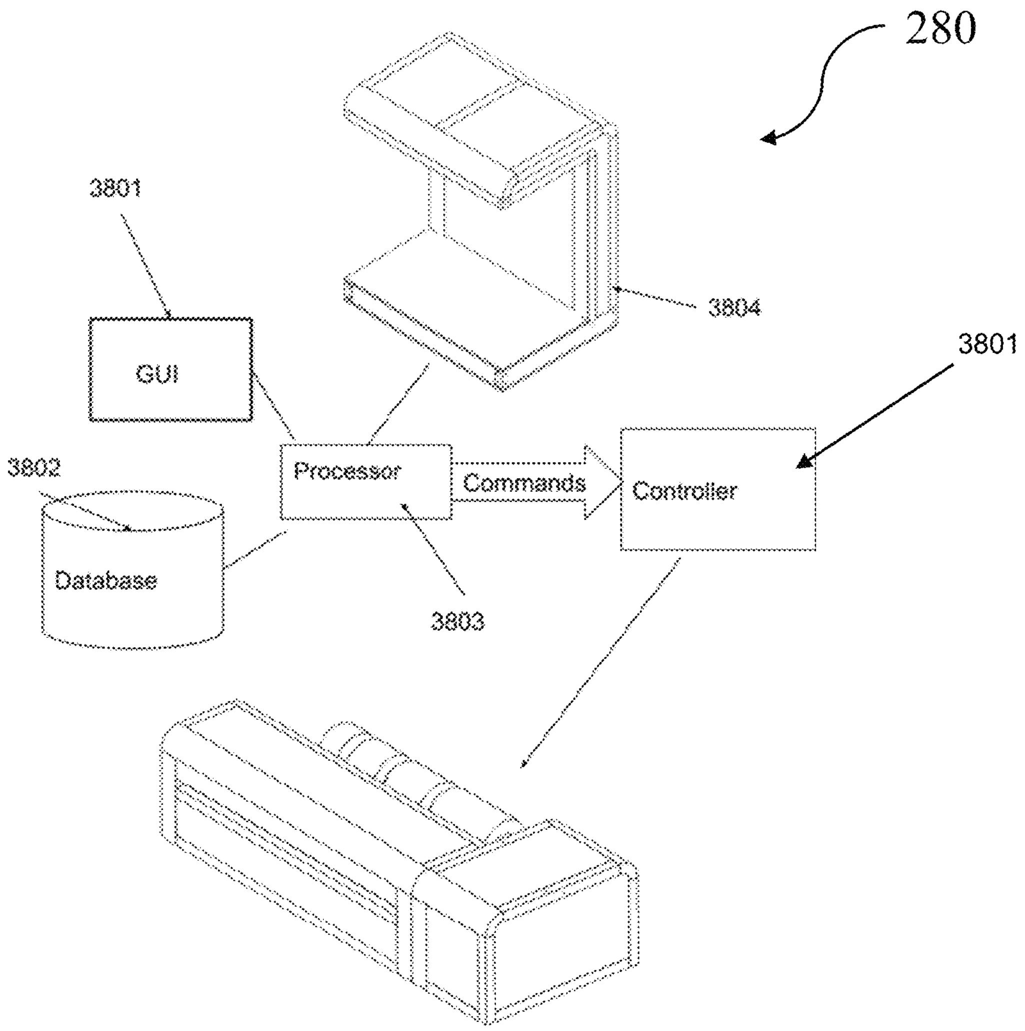
FIG. 28 is a flow chart illustrating a method for automating the packaging of items, such as surgical instruments, into bags, peel pouches, or pouches for sterilization, according to various aspects of the present disclosure.

FIG. 28 illustrates various aspects of an example system 280 for automating the packaging of items, such as surgical instruments, into bags or pouches, wherein the packaged item may be sterilized. The bagmaker depicted in FIG. 28 may include a command issuing device, wherein the command issuing device may include a GUI 3801, wherein GUI 3801 may be configured for accepting user input and displaying system messages, a data repository 3802, configured for storing system data, an item imaging device 3804, for obtaining imaging data of instrumentation for the item, and a processor 3803 for controlling the GUI 3801, accessing the data repository 3802, controlling and interpreting the data from the item imaging device, and issuing commands to the controller 3001.

Figure 29:
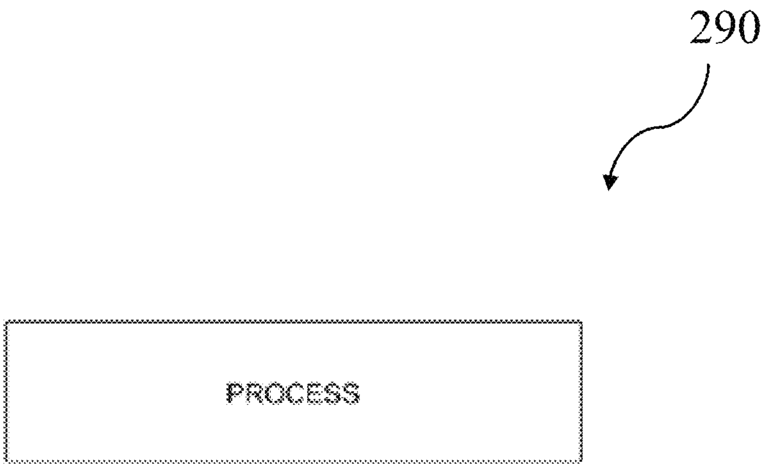
FIG. 29 is a Graphic User Interface including an example process button, according to various aspects of the present disclosure.
Figure 30:
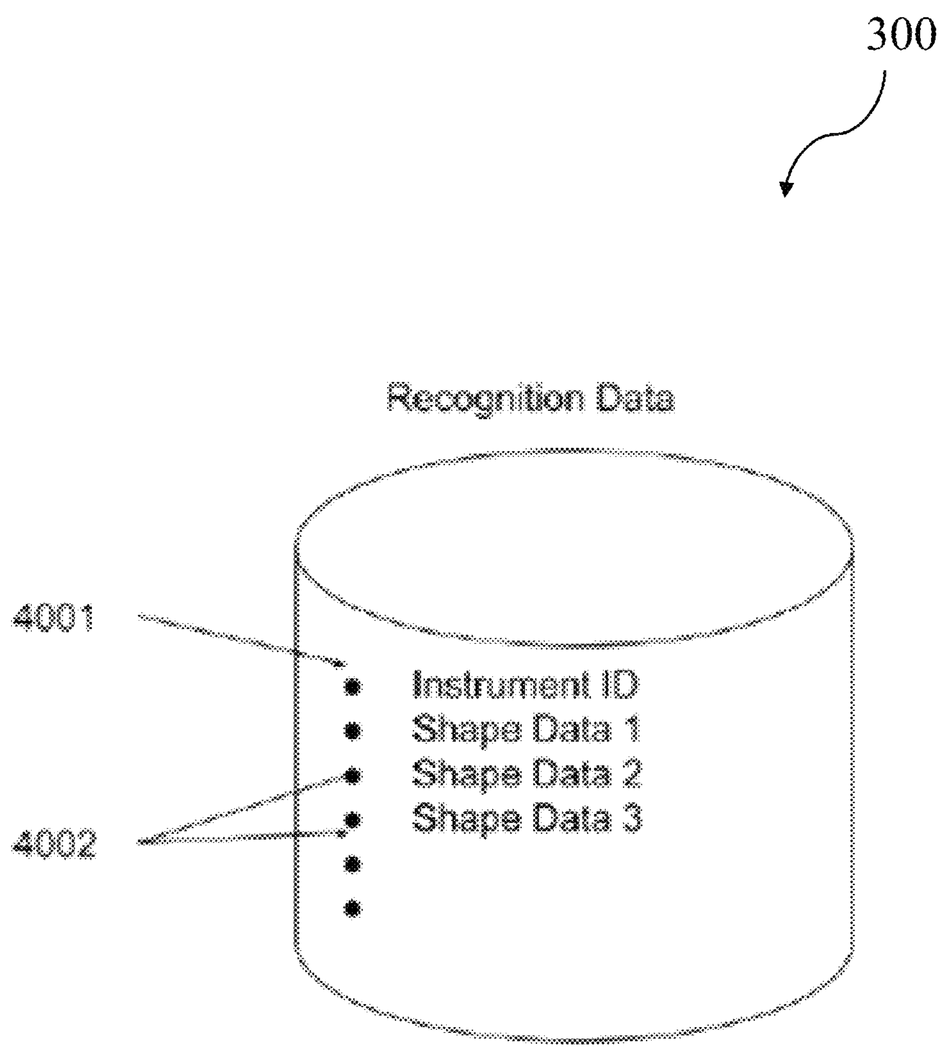
FIG. 30 illustrates a data repository including a table for recognition data, for use in accordance with various aspects of the present disclosure.

Further, the various components of the system 280 of FIG. 28 may carry out functionality reflected in the various flowcharts herein. Further to that functionality, the GUI of the example depicted in FIG. 28 may have a process button as depicted in FIG. 29, wherein the process button may commence a procedure for capturing an image of an object and collecting the data. Additionally, further to the functionality of the data repository 3802, the example system 280 depicted in FIG. 28 may include a recognition data table 300, as illustrated in FIG. 30. Columns stored in the recognition data table 300 may include but are not limited to item identification 4001 and various values 4002, wherein values 4002 may describe the shape of the item such as length, width, etc.

Figure 31:
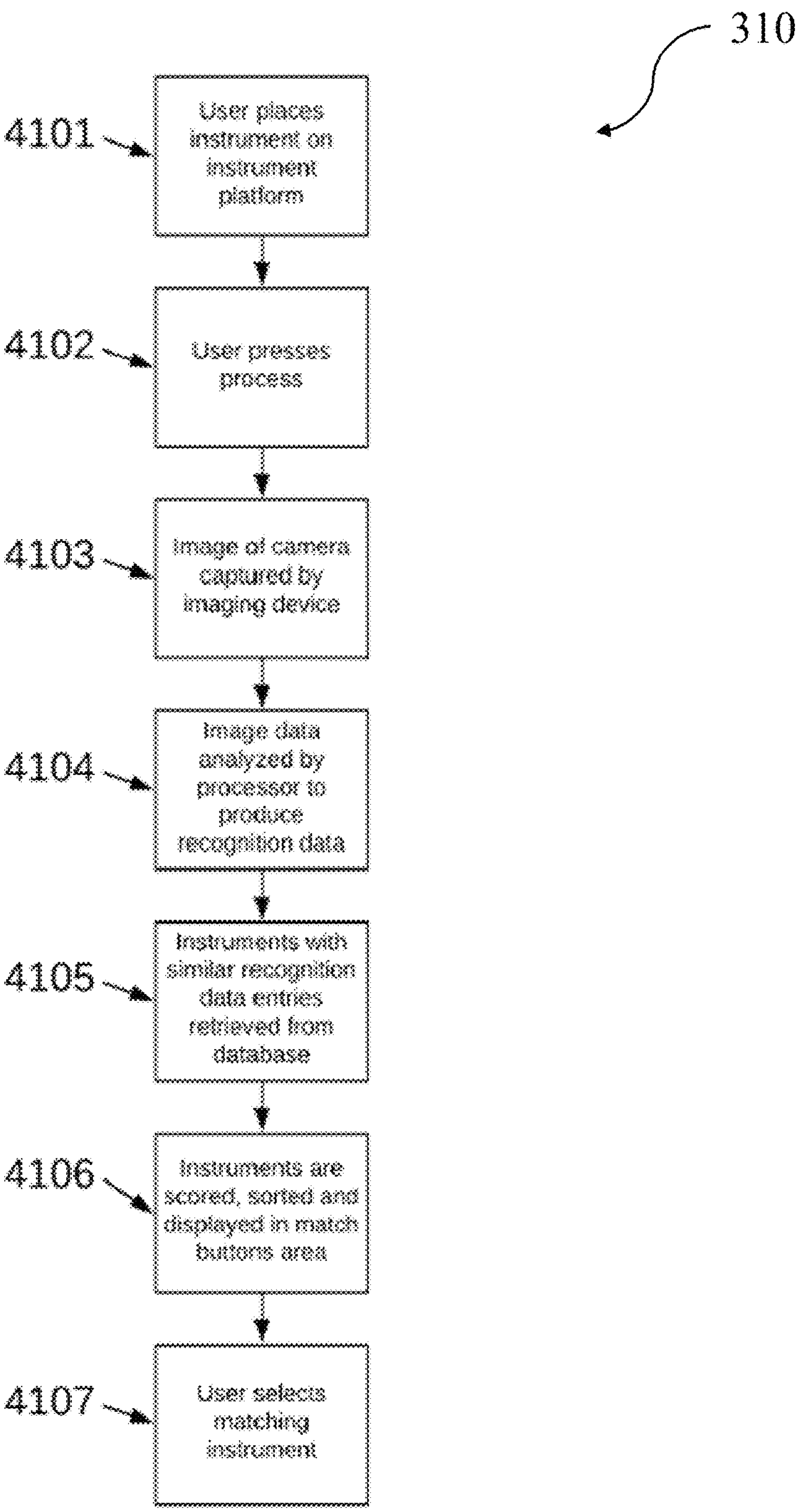
FIG. 31 is a flow chart illustrating a method for performing an item image recognition process, according to various aspects of the present disclosure.

In the example system 280 depicted in FIG. 28, item image recognition may additionally be used for item determination 2901 (FIG. 20), wherein various aspects of a flowchart of an example item image recognition process are depicted in FIG. 31. As shown in FIG. 31, at 4101, an item may be selected and subsequently placed on the item platform. Following, at 4102, a process button may be engaged, such as by a user pressing the process button 290 depicted in FIG. 29. In response to the user action, the method may proceed to 4103, wherein the processor may receive imaging data from the instrument imaging device. At 4104, the processor may analyze the image data and produces recognition data. Following, at 4105, the processor may retrieve one or more item types from the data repository that contain recognition data similar to that of the just imaged item. The retrieved item types may then be scored and then sorted by highest score and/or other similar value measurement. Upon assortment, the retrieved item types may be displayed in the determined order 4106, such as in the match buttons area 3102 of FIG. 22. Finally, at 4107, the instrument that matches the just processed instrument may be selected.

Figure 32:
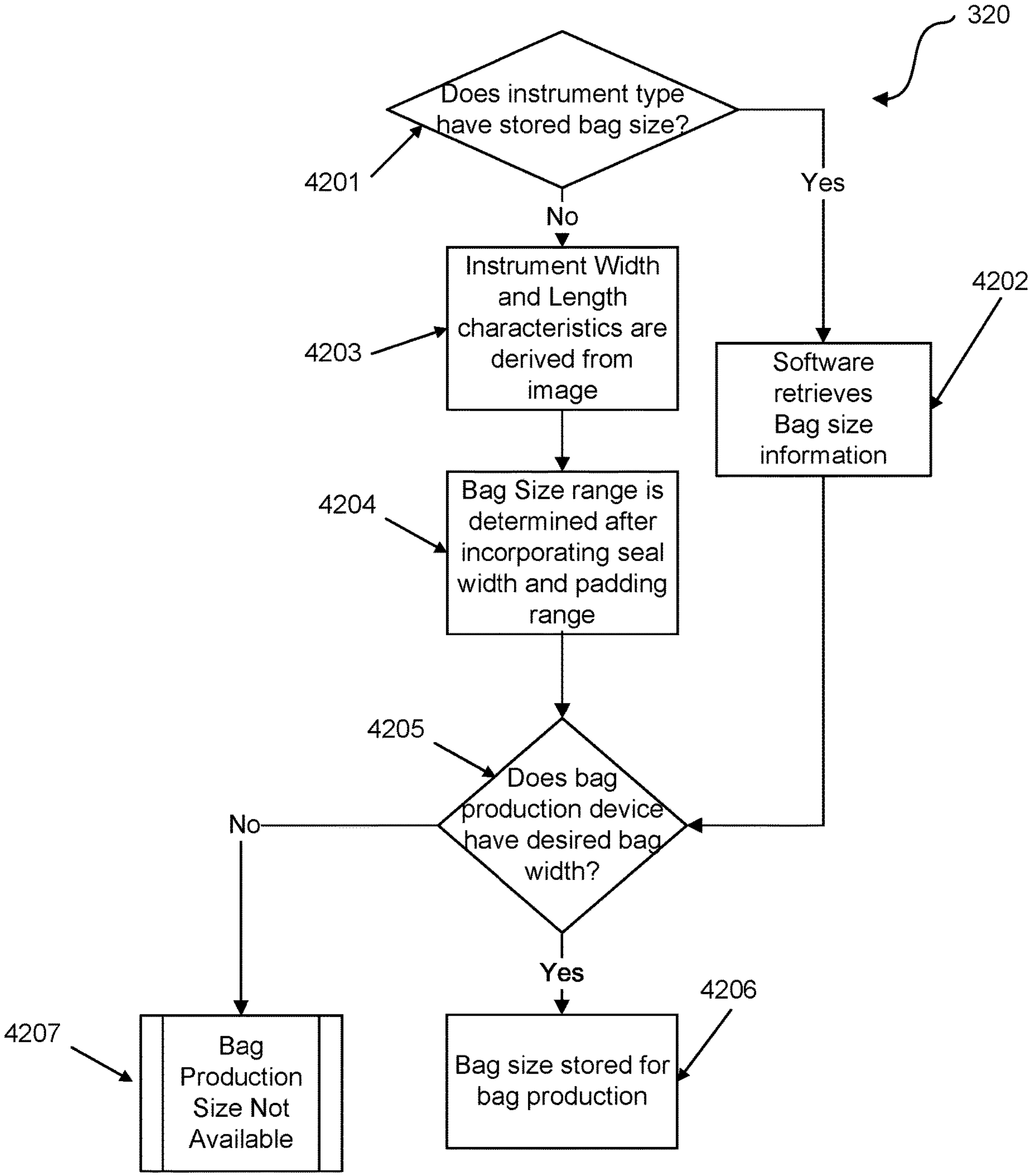
FIG. 32 is a flow chart illustrating a method for visual identification of an item type and determination of bag size, for use in accordance with various aspects of the present disclosure.

FIG. 32 shows a flow chart 320 of an example method for determination of visual identification of an item type and bag size. First, at 4201, a determination may be made as to whether the selected item type has a preferred bag size stored in the memory. If the selected item type does have a preferred bag size stored in the memory, the corresponding data may be received at 4202. However, if the selected item type does not have a stored preferred bag size, the item length and width characteristics may be retrieved from the image at 4203. Following, at 4204, those values, as well as the values for the seal widths seal and minimum and maximum padding, may be used to create a range for the desired bag width and length. At 4205, a determination may be made as to whether the bagmaker has a tube width within the desired range for making the bag. If it is determined has the desired range of tube width, the width and calculated length are stored for use in the bag production 4206. If it is not determined at 4205 that the desired range of tube width is available, the bag production size may be determined to not be available in a step 4207.

Figure 33:
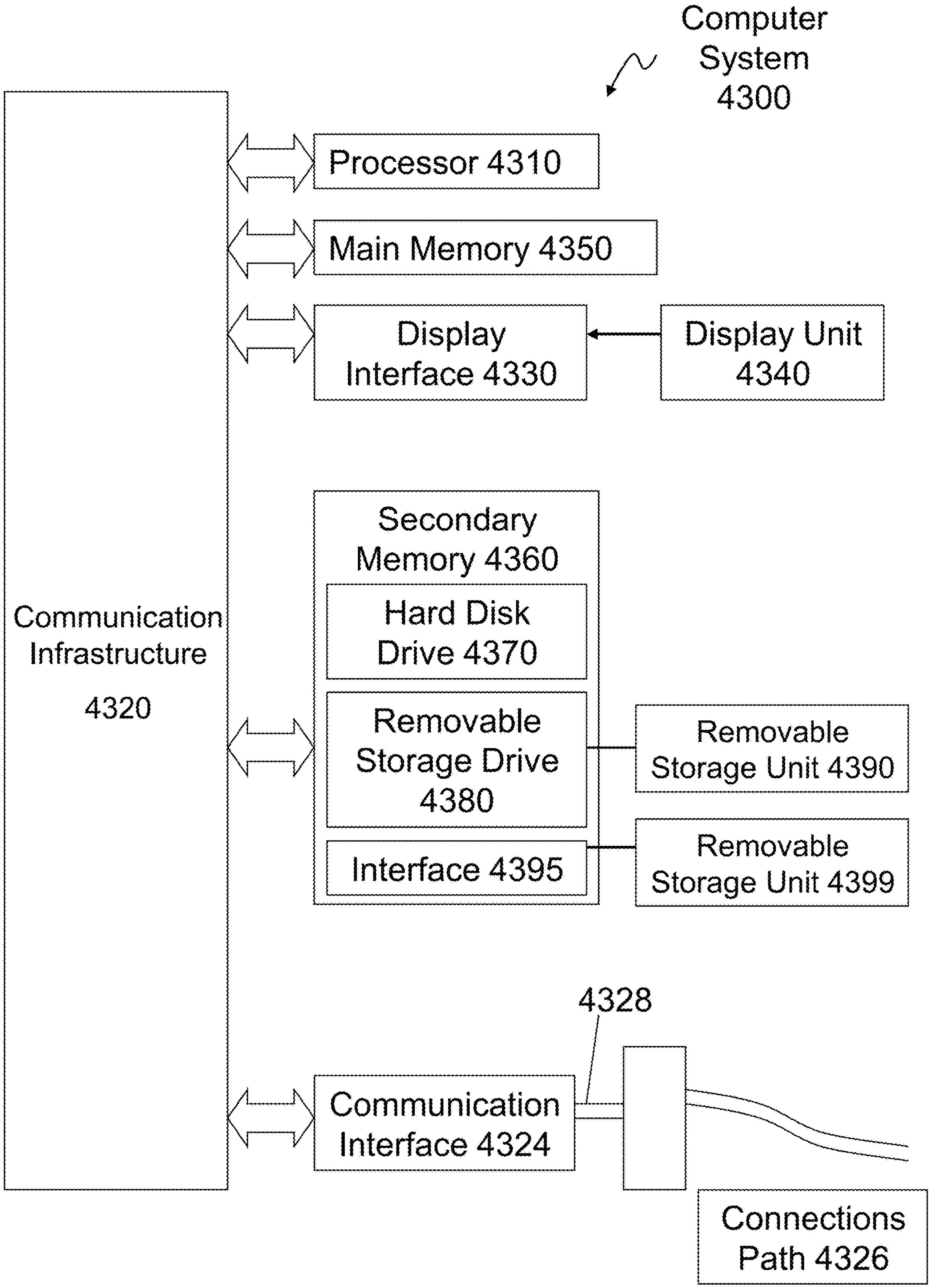
FIG. 33 shows various aspects of an example computer system usable in accordance with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. Various aspects of an example of such a computer system 4300 are shown in FIG. 33.

Computer system 4300 includes one or more processors, such as processor 4304. The processor 4304 may be coupled to a communication infrastructure 4320 (e.g., a communications bus, cross-over bar, or network). Various software aspects are described in terms of this example computer system. After reading this description, it will become apparent to a person skilled in the relevant art(s) how to implement aspects hereof using other computer systems and/or architectures.

Computer system 4300 may include a display interface 4330 that forwards graphics, text, and other data from the communication infrastructure 4320 (or from a frame buffer not shown) for display on a display unit 4340. Computer system 4300 may include a main memory 4350, such as random access memory (RAM), and may also include a secondary memory 4360. The secondary memory 4360 may include, for example, a hard disk drive 4370 and/or a removable storage drive 4380, representing a floppy disk drive, a magnetic tape drive, an optical disk drive, etc. The removable storage drive 4380 may read from and/or write to a removable storage unit 4390 in a well-known manner. Removable storage unit 4390, represents a floppy disk, magnetic tape, optical disk, etc., which may be read by and written to removable storage drive 4380. As will be appreciated, the removable storage unit 4318 may include a computer usable storage medium having stored therein computer software and/or data.

Alternative aspects may include secondary memory 4360 and may include other similar devices for allowing computer programs or other instructions to be loaded into computer system 4300. Such devices may include, for example, a removable storage unit 4390 and an interface 4395. Examples of such may include a program cartridge and cartridge interface (such as that found in video game devices), a removable memory chip (such as an erasable programmable read only memory (EPROM), or programmable read only memory (PROM)) and associated socket, and other removable storage units 4390 and interfaces 4395, which allow software and data to be transferred from the removable storage unit 4390 to computer system 4300.

Computer system 4300 may also include a communications interface 4324. Communications interface 4234 may allow software and data to be transferred among computer system 4300 and external devices. Examples of communications interface 4324 may include a modem, a network interface (such as an Ethernet card), a communications port, a Personal Computer Memory Card International Association (PCMCIA) slot and card, etc. Software and data transferred via communications interface 4324 may be in the form of signals 4328 which may be electronic, electromagnetic, optical or other signals capable of being received by communications interface 4324. These signals 4328 may be provided to communications interface 4324 via a communications path (e.g., channel) 4326. This path 4326 may carry signals 4328 and may be implemented using wire or cable, fiber optics, a telephone line, a cellular link, a radio frequency (RF) link and/or other communications channels. As used herein, the terms “computer program medium” and “computer usable medium” refer generally to media such as a removable storage drive 4380, a hard disk installed in hard disk drive 4370, and/or signals 4328. These computer program products may provide software to the computer system 4300. Aspects of the present disclosure are directed to such computer program products.

Computer programs (also referred to as computer control logic) may be stored in main memory 4350 and/or secondary memory 4360. Computer programs may also be received via communications interface 4324. Such computer programs, when executed, may enable the computer system 4300 to perform the features in accordance with various aspects discussed herein. In particular, the computer programs, when executed, may enable the processor 4310 to perform the features in accordance with aspects of the present disclosure. Accordingly, such computer programs may represent controllers of the computer system 4300.

Where aspects of the present disclosure may be implemented using software, the software may be stored in a computer program product and loaded into computer system 4300 using removable storage drive 4314, hard drive 4312, or communications interface 4320. The control logic (software), when executed by the processor 404, may cause the processor 404 to perform the functions described herein. In another aspect of the present disclosure, the system may be implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the present disclosure may be implemented using a combination of both hardware and software.

Figure 34:
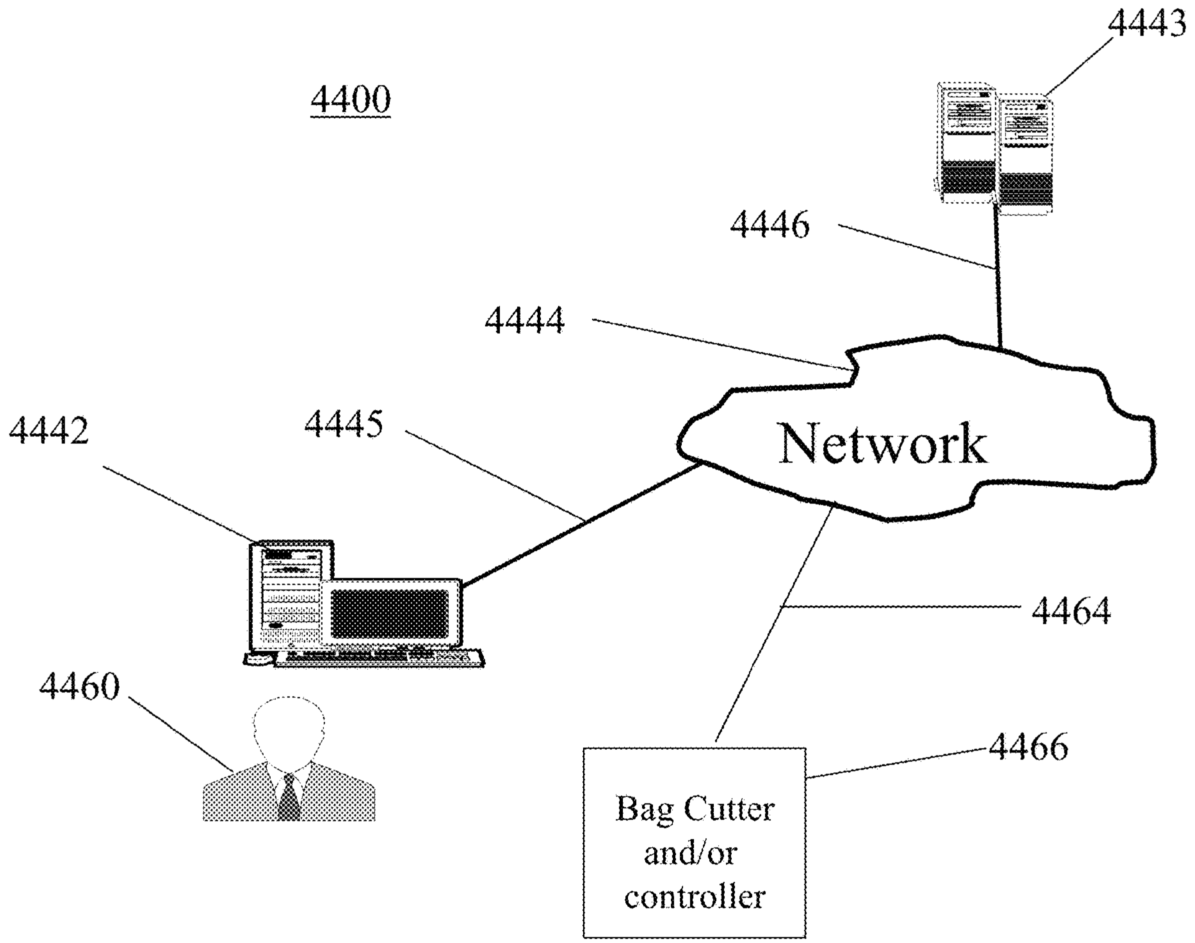
FIG. 34 is a block diagram of various example system components, for use in accordance with aspects of the present disclosure.

FIG. 34 is a block diagram of various example system components, for use in accordance with aspects of the present disclosure. FIG. 34 shows a communication system 4400 usable in accordance with aspects hereof. The communication system 4400 shown in FIG. 34 includes one or more accessor 4460 (also referred to interchangeably herein as one or more "users") and one or more terminals 4442. In one aspect, data for use in accordance with aspects of the present disclosure is, for example, input and/or accessed by accessor 4460 via terminal 4442, such as personal computers (PCs), command issuing devices including Graphical User Interfaces (GUIs), minicomputers, mainframe computers, microcomputers, telephonic devices, or wireless devices, such as personal digital assistants (PDAs), smart phones, or other hand-held wireless devices coupled to a server 4443, such as a PC, minicomputer, mainframe computer, microcomputer, or other device having a processor and a repository for data and/or connection to a repository for data, via, for example, a network 4444, such as the Internet or an intranet, and couplings 4445, 4446, 4464. The couplings 4445, 4446, 4464 include, for example, wired, wireless, or fiber optic links. In one example, bag cutter 4466 may be coupled to network 4444 via coupling 4464 and be therefore able to receive input data from user 4460, such that the user may be able to input bag size parameters, such as a desired length or width, and other data for operation of the cutter, for example. In another variation, the method and system in accordance with aspects of the present disclosure may operate in a stand-alone environment, such as on a single terminal. While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The invention claimed is:

1. A system for making a bag, the system comprising:

a bagmaker, the bagmaker including:

at least two roller modules for supplying and directing feeding of a plurality of widths of tubing;

a motor creating a motion of one of the at least two roller modules, the selected one of the at least two roller modules being interoperable with a corresponding selected one of the plurality of widths of tubing to form a bag of a determined width from the selected tubing, the determined width corresponding to a size of an item to be contained in the bag;

a bag cutter;

a heat sealing device; and a controller configured to selectively control operation of the bagmaker to:

feed a selective length of the selected tubing and form the bag of the determined width from the selected tubing;

cut the selected tubing; and heat seal the selected tubing to form at least one closed and sealed end thereof.

2. The system of claim 1, wherein the controller is further configured to selectively control operation of the bagmaker to:

prior to cutting the tubing, feed an additional selective length of the tubing, the additional selective length corresponding to the selective length of the tubing;

after cutting the tubing, eject the cut and heat sealed tubing from the bagmaker; and retracting a remaining uncut portion of the tubing.

3. The system of claim 1, wherein the system is configured to interoperate with an instrument processor.

4. The system of claim 3, wherein the instrument processor includes a device for optical identification of an instrument.

5. The system of claim 1, wherein the controller is selectively controlled via a command issuing device, the command issuing device accessing a processor and a data repository.

6. The system of claim 1, wherein each roller module is for making a respective width of the bag.

7. The system of claim 6, wherein the one of the at least two roller modules comprises:

a body;

a drive shaft located within body; and a shaft engaging feature for selectively engaging the drive shaft.

8. The system of claim 1, wherein the bag cutter comprises:

a body;

a drive belt;

a linear rail; and a blade carriage selectively moveable along the linear rail via the drive belt.

9. The system of claim 1, wherein heat sealing device comprises:

a housing;

a hot bar;

a compression bar;

a heat sealer drive having a rotatable drive shaft; and a cam operable via the rotatable drive shaft;

wherein the compression device is selectively moveably interoperable with the hot bar via engagement of the cam with the compression device.

10. The system of claim 9, wherein the cam translates rotational motion of the drive rotatable shaft into linear movement of the compression bar.

11. The system of claim 1, wherein a first width of a first roller of the at least two module rollers is different from a second width of a second roller of the at least two module rollers.

12. The system of claim 1, further comprising:

a Graphical User Interface (GUI) interoperable with at least one of the bagmaker or the controller, wherein the GUI is configured to receive input from a user for controlling bagmaker.

13. The system of claim 1, wherein the controller is further configured to determine the selective length of the tubing.

14. The system of claim 1, wherein a predetermined width of tubing is fed using one of the at least two roller modules.

15. The system of claim 1, wherein the bagmaker receives a command from the controller, the command comprising: a size of tubing to be used for making the bag, and a variably selectable length of the bag to be made.

16. The system of claim 1, wherein each roller module of the at least two roller modules is individually actionable.

17. The system of claim 1, wherein one of the at least two roller modules comprises:

a body for housing a drive shaft engaged with a clutch;

a clutch gear;

a roller gear including a lower roller gear and an upper roller gear for causing the motion of one of the at least two roller modules thereby to feed the tubing;

a roller; and a bag feed slot.

18. The system of claim 1, wherein the at least two roller modules are rotatable about a single axis.

19. A system for making a bag, the system comprising:

a bagmaker, the bagmaker including:

at least two roller modules for supplying and directing feeding of a plurality of widths of tubing;

a motor creating a motion of one of the at least two roller modules, the selected one of the at least two roller modules being interoperable with a corresponding selected one of the plurality of widths of tubing to form a bag of a determined width from the selected tubing, the determined width corresponding to a size of an item to be contained in the bag;

a bag cutter;

a heat sealing device; and a controller configured to selectively control operation of the bagmaker to:

feed a selective length of the selected tubing and form the bag of the determined width from the selected tubing;

heat seal at least a first end of the selected tubing to form one closed and sealed end thereof; and cut the selected tubing.

20. A system for making a bag, the system comprising:

a bagmaker, the bagmaker including:

at least two roller modules for supplying and directing feeding of a plurality of widths of tubing, wherein the at least two roller modules are rotatable about a single axis, wherein each of the at least two roller modules is individually actionable via a clutch;

a motor creating a motion of one of the at least two roller modules, the selected one of the at least two roller modules being interoperable with a corresponding selected one of the plurality of widths of tubing to form a bag of a determined width from the selected tubing, the determined width corresponding to a size of an item to be contained in the bag;

a bag cutter;

a heat sealing device; and a controller configured to selectively control operation of the bagmaker to:

feed a selective length of the selected tubing and form the bag of the determined width from the selected tubing;

cut the selected tubing; and heat seal the selected tubing to form at least one closed and sealed end thereof.

21. A system for making a bag, the system comprising:

a bagmaker, the bagmaker including:

at least two roller modules for supplying and directing feeding of a plurality of widths of tubing, wherein the at least two roller modules are rotatable about a single axis, wherein each of the at least two roller modules is individually actionable via a clutch;

a motor creating a motion of one of the at least two roller modules, the selected one of the at least two roller modules being interoperable with a corresponding selected one of the plurality of widths of tubing to form a bag of a determined width from the selected tubing, the determined width corresponding to a size of an item to be contained in the bag;

a bag cutter;

a heat sealing device comprising, a housing, a hot bar, a compression bar, a heat sealer drive having a rotatable drive shaft, and a cam operable via the rotatable drive shaft, wherein the compression device is selectively moveably interoperable with the hot bar via engagement of the cam with the compression device; and a controller configured to selectively control operation of the bagmaker to:

feed a selective length of the selected tubing and form the bag of the determined width from the selected tubing;

cut the selected tubing; and heat seal the selected tubing to form at least one closed and sealed end thereof.

* * * * *